(12) United States Patent
Tidhar

(10) Patent No.: US 8,809,787 B2
(45) Date of Patent: Aug. 19, 2014

(54) GUNSHOT DETECTION SYSTEM AND METHOD

(71) Applicant: Elta Systems Ltd., Ashdod (IL)

(72) Inventor: Gil Tidhar, Modiin (IL)

(73) Assignee: Elta Systems Ltd., Ashdod (IL)

( * ) Notice: Subject to any disclaimer, the term of this patent is extended or adjusted under 35 U.S.C. 154(b) by 0 days.

(21) Appl. No.: 14/027,844

(22) Filed: Sep. 16, 2013

(65) Prior Publication Data

US 2014/0184806 A1 Jul. 3, 2014

Related U.S. Application Data

(63) Continuation of application No. 12/841,289, filed on Jul. 22, 2010, now abandoned, which is a continuation of application No. PCT/IL2008/000105, filed on Jan. 23, 2008.

(51) Int. Cl.
*H01L 27/14* (2006.01)

(52) U.S. Cl.
USPC .................................. 250/339.02

(58) Field of Classification Search
CPC . H04N 5/332; G06K 9/00771; G06K 9/3233; H01L 27/14; H01L 27/14643; H01L 27/14649
USPC .................................. 250/339.02
See application file for complete search history.

(56) References Cited

U.S. PATENT DOCUMENTS

| | | |
|---|---|---|
| 3,699,341 A | 10/1972 | Quillinan et al. |
| 3,931,521 A | 1/1976 | Cinzori |
| 3,936,822 A | 2/1976 | Hirschberg |
| 5,001,348 A | 3/1991 | Dirscherl et al. |
| 5,455,868 A | 10/1995 | Sergent et al. |
| 5,686,889 A | 11/1997 | Hillis |
| 5,703,321 A | 12/1997 | Feierlein et al. |
| 5,751,215 A | 5/1998 | Hall, Jr. |
| 5,912,862 A | 6/1999 | Gustavsen et al. |
| 5,973,998 A | 10/1999 | Showen et al. |
| 6,178,141 B1 | 1/2001 | Duckworth et al. |
| 6,496,593 B1 | 12/2002 | Krone, Jr. et al. |
| 6,781,127 B1 | 8/2004 | Wolff et al. |
| 6,969,856 B1 | 11/2005 | Hillenbrand et al. |

(Continued)

FOREIGN PATENT DOCUMENTS

| | | |
|---|---|---|
| EP | 1112459 | 7/2001 |
| EP | 1811315 A2 | 7/2007 |
| GB | 2280563 A | 2/1995 |
| WO | 0223227 A2 | 3/2002 |

OTHER PUBLICATIONS

Israel Patent Application No. 118619 filed Jun. 11, 1996 entitled "Dual Sensor Surveillance System".

(Continued)

*Primary Examiner* — Marcus Taningco
(74) *Attorney, Agent, or Firm* — Browdy and Neimark, PLLC

(57) ABSTRACT

A device and a method for use in detection of a muzzle flash event is described. The device can include a Photo Detector Array (PDA), sensitive in at least a portion of the NIR and SWIR spectrum, and a filter of electromagnetic radiation selectively passing in this portion a spectral range of low atmospheric transmission, the PDA has an integration time shorter than a duration of the muzzle flash event.

19 Claims, 9 Drawing Sheets

(56) References Cited

U.S. PATENT DOCUMENTS

| | | |
|---|---|---|
| 7,202,794 B2 | 4/2007 | Huseynov et al. |
| 2006/0021498 A1* | 2/2006 | Moroz et al. ............... 89/41.06 |
| 2007/0125951 A1* | 6/2007 | Snider et al. ............ 250/363.03 |
| 2007/0158638 A1 | 7/2007 | Perera et al. |

OTHER PUBLICATIONS

A. Vick et al., "Aerospace Operations in Urban Environments: Exploring New Concepts", RAND Corporation monograph/report MR-1187-AF, pp. 213-215, 2002.

A. Richards, "Applications for high-speed infrared imaging", Abstract. Proc. SPIE vol. 5580, p. 137-145, 2005.

A. Richards, "Infrared Camera Measures Bullet Heating", Advanced Imaging Magazine, Mar. 2004.

G. Settles et al., "Full-scale high-speed Schlieren Imaging of Explosions and Gunshots," SPIE paper 5580-174, Proc. 26th Inti. Conf. on High-Speed Photography and Photonics, Alexandria, USA, 2004.

G. Settles et ai.,"Fuii-Scale High-Speed "Edgerton" Retroreflective Shadowgraphy of Explosions and Gunshots", 5th Pacific Symposium on Flow Visualization and Image Processing, 2005, Australia.

Pauli et al.,"Infrared Detection and Geolocation of Gunfire and Ordnance Events From Ground and Air Platforms", 6 NATO Symposium on "Systems, Concepts and Integration (SCI) Methods and Technologies for Defence Against D Terrorism" London, UK, 2004.

M. Ertem, "An Acoustic Sensor for the VIPER Infrared Sniper Detection System", Military Sensing Symposia, IRIS Specialty Group on Battlefield Acoustics and Seismics, 1999.

T. Spera et al., "Uncooled infrared sensors for an integrated sniper location system", SPIE Proceedings, vol. 2938, pp. 326-339.

A. Fish et al., "An APS With 2-D Winner-Take-All Selection Employing Adaptive Spatial Filtering and False Alarm Reduction", IEEE Transactions on Electron Devices, vol. 50(1). Jan. 2003.

J.Ohta et a.l, "An Image Sensor with an In-Pixel Demodulation Function for Detecting the Intensity of a Modulated Light Signal", IEEE Transactions on Electron Devices, vol. 50(1), Jan. 2003.

M.C. Pitter et al., "Dual-phase synchronous light detection with 64'64 CMOS modulated light camera", Abstract. Electronics Letters, vol. 40(22), Oct. 2004.

M.C. Pitter et al., "Phase-Sensitive CMOS photo-circuit array for modulated thermoreflectance measurements", Electronics Letters, Sep. 2003, vol. 39(18)—Abstract.

S. Bourquin et al., "Two-dimensional smart detector array for interferometric applications", Abstract. Electronics Letters, Jul. 2001, vol. 37(15).

Ando et al., "Correlation Image Sensor: Two-dimensional Matched Detection of Amplitude-modulated Light", IEEE Transactions on Electron Devices, vol. 50, No. 10. Oct. 2003, p. 2059.

V. Douence, et al., "Hybrid Image Sensor with Multiple On-chip Frame Storage for Ultra High Speed Imaging", Proc. of SPIE, vol. 5580, 2005.

"Laser-based sniper detection system unveiled for army robot", Laser Focus World, Oct. 3, 2005, Boston, MA, Burlington MA.

A. Richards et al., "Passive Thermal Imaging of Bullets in Flight", Proc. of SPIE, vol. 5405 (SPIE, Bellingham WA, 2004), p. 258-263.

M. Kastek et al, "Sniper detection using infrared camera—technical possibilities and limitations", Proc. of SPIE, vol. 7666,2010.

Settles, "The Penn state full-scale sch I ieren system" 11th International Symposium on Flow Visualization, Aug. 9-12, 2004 University of North Dame, Notre Dame, Indiana, USA, p. 1-12.

Kagan, "Lessons from the battle of Grozny, 1994-1995", "Conventional and unconventional warfare since 1945",US Military Academy, Cadet Sean Mccafferty 'OO,co E4 West Point, NY May 1, 2000.

R. Dlugosz et al.,"High-precision analogue peak detector for X-ray imaging applications", Electronics Letters, vol. 43, No. 8, p. 440, Apr. 12, 2007.

Burton et al. "Improved Integrated Sniper Location System" Part of SPIE Conference on Sensors, c31, Information, and Training Technologies for Law Enforcement, Boston Massachusetts,vol. 3577 Nov. 1998, vol. 3577, p. D 243-252.

A. White, "Incoming fire: sniper-detection systems support counter-insurgency operations", I DR, Oct. 24, 2006 p. 1-10.

G.L Duckworth et al., "Fixed and wearable acoustic counter-sniper systems for law enforcement" Sensors, c31, Information, and Training Technologies for law Enforcement SPIE Proceedings vol. 3577, Nov. 3-5, 1998, Boston, MA.

M. Zahler et al. "SWAD—Small arms fire Warning and Direction finding System—a passive IP concept" Proc. of SPIE vol. 6542, 654237, (2007).

Hamamatsu, "InGaAs Linear Image Sensor", Image sensors, May 2005, pp. 1-4, XP002510267.

International Search Report, mailed Jan. 27, 2009 from PCTIIL2008/000105, filed Jan. 23, 2008.

Nelson, R.J. "Integrated Hostile Fire Indication Sensor", Solid State Scientific Corporation, NAVAIR Public release 09-134, Jun. 2, 2008, available at: http://www.virtualacquisitionshowcase.com/document/1040/briefing.

Moroz Sa et al "Airborne Deployment of and Recent Improvements to the Viper Counter Sniper System," Naval Research Laboratory, Washington, DC 1999, available at: www.dtic.mil/dticitrfulltext/u2/a390309.pdf.

* cited by examiner

GUNSHOT DETECTION SYSTEM AND METHOD

RELATED APPLICATIONS

This application is a Continuation of International Application No. PCT/IL2008/000105 filed on Jan. 23, 2008, which is incorporated herein in its entirety.

FIELD OF THE INVENTION

This invention relates to the field of detection and location of high speed photon emitting events, of firearms gunshots, and particularly of muzzle flashes.

BACKGROUND OF THE INVENTION

There are various methods that can be used for snipers detection and locating weapon fire, including small arms. The phenomena utilized by these methods include the so-called muzzle blast and flash; the shock wave, vortex, and thermal signature of the bullet in flight; and retro-reflection from the sniper's optical sight. Other phenomena, for instance disturbances of the refractive index of atmosphere caused by vortices shed by the bullet in flight, can potentially be utilized for snipers detection.

One of the optical signals caused by weapon firing is the muzzle flash, which is the incandescent flash at the weapons muzzle caused by the ignition of oxygen, the expulsion of burning powder grains and the expansion of powder gasses. The phenomenon of muzzle flash is more clearly pronounced in various assault rifles, short barrel infantry weapons, and "cut down" weapons. For instance, in a short barrel, the bullet can leave the barrel before the powder is completely burnt. In this case, the unburnt powder ignites in the air, giving off a bright flash. For a shooter, muzzle flash presents a serious problem: it increases the shooter visibility to the enemy and obscures the target view. As a result, the shooter using a weapon generating muzzle flash must move quickly after firing to avoid return fire.

Although muzzle flash can be partially hidden by flash suppressors or partially reduced by using cartridges with a faster-burning gunpowder, so that the propellant gases will already have begun to cool by the time they exit the barrel, this is not always convenient for the shooter. For example, the size of a device necessary to hide the muzzle flash from an enemy can be too large.

For the side opposite to a shooter, a problem consists in a muzzle flash detection, which can be considered as one of high speed imaging applications. For purposes of study, such detection can be done in the laboratory.

At the present time, a few muzzle flash detecting systems can be used in the battle field. Examples of such systems include Radiance Technologies' WeaponWatch™, RAFAEL's SPOTLITE, Maryland Advanced Development Lab's VIPER. The VIPER equipment, for example, consists of a mid-wave infrared (MWIR) camera, together with real-time signal processing, magnetic compass, and user display and alarm. It is advertised as providing gun detection within 70 msec after gunfire and geolocation of the firing event. Using MWIR-camera also allows concurrently performing forward looking infrared imaging (FLIR) of a region of interest.

The known snipers detection methods also suffer from various problems. One of the problems associated with MWIR cameras, is that these cameras are expensive and bulky. Most of them are based on cryogenically cooled fast refresh-rate detectors.

Uncooled infrared sensors for an Integrated sniper location system were studied in [8]. The system of [8] had a focal plan array size of 320×240 pixels allowing a field of view of 20 (H)×15 (V) degrees with an accuracy of 2 mrad. The system's weight was 5 pounds, frame rate 60 Hz, size 12.2 (L)×5.0 (W)×4.1 (H) inches, noise equivalent input 5.6×10-12 W/cm2, and power consumption 9V. The projected price of the device was about $10,000. The uncooled bolometric detectors are typically significantly slower than the muzzle flash, and thus the signal is smeared over a long time harming the signal to noise ratio (SNR). These detectors are mostly sensitive to the 8-12 um range, where the signature is relatively low.

Other countersniper systems, such as relying on acoustic signals (e.g. muzzle blast and bullet shock wave), may be lighter and lower in cost than systems based on cooled detectors. However, the acoustic countersniper systems typically have low angular accuracy and performance which is reduced in urban terrain, due to sound reflections.

Also, detection of rifle, sniper and small arm shooting or firing can be in principle done by the solar blind UV (SBUV) imaging technology and used for force protection and snipers detection. The UV signature of the firing is due to the secondary burning of the residual gun powder, ejected from the barrel. Nevertheless, this signature is also relatively small and may not provide usable detection range and acceptable false alarm rate. Some design and manufacturing of SBUV imaging systems is done, for example, by Ofil LTD (http://www.s-buv.com).

In principle, various detection methods can be combined with each other. Also, a muzzle flash detected by any method can be shown on a scenery image obtained by imaging with visible light. For example, technology of the Ofil LTD utilizes a bi-spectral visible-UV DayCor® camera and is aimed and presenting such combined images.

SUMMARY OF THE INVENTION

There is a need in the art in facilitating detection and location of high speed photon emitting events, of firearms gunshots, and of muzzle flashes by providing a novel fast event detection technique allowing effective detection. A presented here novel technique, constructed by the inventors, has adaptations (versions and embodiments) useful for such detection.

The main idea of the technique of the inventors applied for example for gunshot detection, is to utilize imaging of light in spectra of relatively short-living and low power muzzle flash components, which though allow achieving a relatively high useful detector signal. The technique may utilize one or more of the following: filtering electromagnetic radiation for acquiring substantially a spectral range corresponding to relatively low light transmission in atmosphere; collecting and sensing electromagnetic radiation in near infrared (NIR) and/or short wave infrared (SWIR) ranges; acquiring pixel images with a relatively small integration (exposure) time or high imaging frame rate; acquiring sequential images with a relatively small dead time between them; acquiring images with a relatively wide field of view (FOV) for a pixel or for a given number of pixels at the light detector; acquiring multipixel images of a scenery; processing outputs of the photodetector (imager) pixels for detection of a flash-type signal portion in the detected light. For example, the processing may select, for any pixel, a signal portion indicative of muzzle flash type intensity variation in time. For another example, the processing may estimate, for any pixel, a likelihood of occurrence of a muzzle flash event, e.g. by comparing a signal obtained from the pixel with the time signature of muzzle flash. The processing may be organized in layers (stages), consecutively processing a smaller number of pixels. For example, the layers may be organized to consecutively reestimate the likelihoods of occurrence of muzzle flash events for a smaller number of pixels at each layer. Processing may be parallel at some layer; however the technique of the inventors may as well utilize non-parallel layers of processing for reducing data bandwidth. For example, the processing may have a layer at which a signal obtained from a pixel is compared to signals obtained from adjacent or close pixels, and if time signatures of a group of such pixels are similar, a possible muzzle flash alarm is suppressed. The processing layers may be connected by pixel selection units, decreasing number of "candidate" pixels processed at the later stage. Each pixel selection unit transmits a list of the "candidate" pixels from an earlier layer to a later layer. For example, a pixel selection layer may be adapted to transmit a limited or a constant number of "candidate" pixels from each frame, by selecting pixels with the highest likelihoods of occurrence of muzzle flash. If output of a processing layer is not the likelihoods, but for example a signal portion indicative of muzzle flash type intensity variation in time (as mentioned above), the consecutive pixel selection layer generates pixels likelihoods. In this sense, a pixel selection layer is complementary to its preceding processing layer. However, the inventors do not require always having a pixel selection layer for each processing layer: outputs of the latter may be for example directed to a memory rather than to the former. In addition to the list of the "candidate" pixels, a processing layer will need additional data for (re)estimating muzzle flash likelihoods. For example, temporal and/or spatial information on outputs of various processing stages and/or of the Photo Detector Array (PDA, e.g. photo diode array) may be needed. The needed data may be stored in a memory unit configured for access by the layer. Before data are stored, they may be compressed or sampled with a reduced sampling rate (relatively to the output of the corresponding data source stage). The compression can be performed in a compressing module. The processing may have analog and digital layers, where the first of digital layers is preceded by an analog-to-digital converter (ADC).

The technique of the inventors can be used for detection and location of strobe light sources, pulsed lasers, lightnings, as well as antitank missile launches and shell firings.

With regards to the wavelengths useful for detection of muzzle flash, the inventors have considered that the detection can be facilitated in some of its aspects by using imagers (e.g. based on PDAs), predominantly sensitive in near-infrared (NIR) and/or short-wave infrared (SWIR) region: in contrast to MWIR/LWIR images, NIR/SWIR imagers typically need not be cooled. Partially due to this fact, partially due to other reasons, NIR/SWIR imagers also may be lighter, less expensive, and less power-consuming than MWIR/LWIR imagers, especially when the MWIR/LWIR imagers are considered together with their respective coolers and portable power supplies, NIR/SWIR imagers (particularly, NIR/SWIR PDAs) include many types of silicon imagers, which typically are sensitive up to about 1050 nm, and many types of InGaAs imagers (i.e. PDAs), which typically are predominantly sensitive in a band starting from around 950 nm and ending somewhere between 1700 and 2500 nm (NIR/SWIR), depending on the specific InGaAs composition. SWIR imagers include some types of Mercury Cadmium Telluride (MCT) imagers. Imagers' sensitivity bands depend not only on their materials, but also on their structures (e.g. quantum structures). A typical sensitivity band has a sharp decline after a sensitivity maximum and ends with a long-wavelength cutoff. In some embodiments, an imager or imager arrangement of the technique of the inventors has a long-wavelength cutoff longer than 3 μm (i.e. the SWIR region edge) while this imager is used for NIR/SWIR imaging; such a long-wavelength cutoff can be useful for example when the imaging is to be done in a broad region within the NIR/SWIR range. In some other embodiments the imager has a cutoff shorter than 3 μm (this relates to those qualities of the typical shorter wavelength imagers that have been discussed above). In some embodiments the cutoff is between 0.75 and 1 μm, in others it is 1 μm and 1.4 μm, in some others it is between 1.4 μm and 1.65 μm, in yet others it is between 1.65 μm and 1.8 μm, in yet some others it is between 1.8 μm and 2.5 μm. In some embodiments, it is the sensitivity maximum that is at a wavelength shorter than 3 μm or alternatively constrained within the specified ranges. Also, in some adaptations, the imager has a sensitivity maximum being at a wavelength longer than 3 μm, so as to utilize a relatively flat region of growth of the sensitivity band, but has a cutoff shorter than about 5 μm, so as to utilize this region of growth not too far away from the band's maximum, i.e. while the sensitivity is already relatively high.

The selection of the photodetector material and sensitivity band parameters can depend for example on type of event or muzzle flash to be detected and on the presence/absence of clutter and the low light atmosphere transmission optical filter. In particular, in some embodiments the wavelength of the sensitivity band maximum is close to or is aligned with one of the atmospheric absorption peaks, so that the imager is utilized efficiently. The imager operation is efficient if it occurs in a range where the imagers sensitivity is more than 20% (or, according to alternative definitions, 35%, 50%, and 70%) than the imager's sensitivity maximum. Thus defined range (i.e. defined according to one of the alternatives) constitutes a predominant range of the imager sensitivity. However, it should be noted, that the efficient use of imager is not a requirement: the sensitivity of the PDA may be sacrificed for other factors, such as response time. Also, a not so efficiently used imager of one type may still be more sensitive than an efficiently used imager of another type. Any imager can be used as long as it is suitably sensitive.

Additionally, for NIR/SWIR imaging, the sensitivity maximum of the imager may be kept at a wavelength longer than 0.75 μm for achieving higher efficiency. Although some NIR/SWIR imaging may be performed if the sensitivity maximum is shorter than 0.75 μm and the cutoff is longer than 0.75 μm.

It should be understood that the above sensitivity considerations are relevant for the sensitivity as measured in circumstances of the imager operation. The sensitivity is dependent on temperature. The operation temperature of the PDA may be lower than −30° C., or between −30° C. and 0° C., or between 0° C. and a PDA's ambient temperature (while it is higher than 0° C.), or higher than the PDA's ambient temperature. The latter option for the PDA selection (i.e. for the PDA operation temperature selection) is used in some of the adaptations in which the portability is a goal; it would require no cooler or would require only a weak cooler. The ambient temperature is the temperature which the PDA would have had the device be not turned on. If there is anything external to the device (e.g. support) or anyone else (e.g. the user) that heats the imager, this would affect the ambient temperature, which by default would be a weather temperature. For the operation temperature to be in the desired range, cooling, when necessary, may be provided by cryogenic coolers in the coolest of these ranges or, for example, by thermoelectric coolers in hotter ranges. Cooling may be or may not be necessary in the hottest of the ranges. For the above temperature ranging it was considered that weather/ambient temperature is often above 0° C.; it is understood, however, that the device may be used at the ambient temperature which is below 0° C. and, possibly, even −30° C.: in this case the device may be configured or adapted to have not to have a cooler or have only a weak cooler. If cooling is used, then focusing optics (and/or filter) may also be mounted within the respective cooled region.

For the purposes of the present application, the limits of infrared ranges are defined here: NIR 0.75-1.0 μm; SWIR 1.0-3 μm; MWIR 3-8 μm; LWIR 8-14 μm. Thus defined ranges correspond to commonly accepted infrared nomenclatures. For example, within the SWIR range there are several absorption peaks of water and carbon dioxide: at approximately 1.15 μm, 1.39 μm, 1.9 μm, and 2.7 μm. The absorption peaks are commonly known and some of them are shown on some of the figures referenced below.

The technique of the inventors may utilize a detector unit configured to have, inter alia, a narrow spectral band filter corresponding to low light transmission in the atmosphere. Such a filter may increase, in some scenarios, signal to clutter and signal to shot noise ratios. In typical muzzle flash detection systems, the spectral band utilized for detection is wide and corresponds to the highest transmission atmospheric windows. In some embodiments of the invention, detection may be performed in the narrow range(s) of the least atmospheric transmission, because though a large portion of the muzzle flash signal would be lost with the introduction of the narrow filter, the reduction of sunlight clutter and the shot noise would be more drastic and would overcompensate the reduction in the informative optical signal, if only the remaining portion of the latter is above the sensitivity threshold.

The technique of the inventors may utilize acquiring images with a relatively small integration (exposure) time and/or high frame rate. In particular, in some adaptations of the technique, the integration time is selected to be substantially equal or smaller than the duration of existence of the muzzle flash components which to be detected (this duration can be defined as a time interval between the moments at which the detected radiation intensity equals half of the maximum detected radiation intensity). The integration time can be defined as a time between resetting a pixel and subsequent reading a pixel or a duration of a time period during which photons collected by a pixel are transformed to electrons of a single signal reading from a pixel. The rationale behind the choice of the integration time is in that imaging for a time longer than the duration of the detection muzzle flash portion would collect rather clutter and noise than a useful signal. The technique may use integration time between The PDA integration time may be between $10^{-2}$ s and $5.0·10^{-3}$ s, or between $5.0·10^{-3}$ s and $2.0·10^{-3}$ s, or between $2.0·10^{-3}$ s and $5.0·10^{-4}$ s, or between $5.0·10^{-4}$ s and $10^{-4}$ s, or it might be less than $10^{-4}$ s.

The desired integration time can be set by an appropriate shutter, particularly an electronic shutter, it should be noted that the technique of the inventors may utilize acquiring images with a relatively long integration time, for example longer than the pulse duration. Nevertheless, in the case of integration time longer than the pulse duration, the smaller is the integration time, the better is the signal to noise ratio and signal to clutter ratio. Moreover, better signal to noise and signal to clutter margins allows enlarging the Instantaneous Field Of View (IFOV) (e.g. by decreasing the focal length of the imaging lens) and thus, for a given pixel count, allows increasing the entire Field Of View (FOV). With integration time shorter than the pulse duration, the inventors' technique can also benefit from analyzing the time signature of the detected signal.

The technique of the inventors may utilize acquiring sequential images with a relatively small dead time between them. The dead time can be define, as a time between reading a pixel and subsequent resetting a pixel. The signal (e.g. charge) generated at the pixel during the dead time gets lost. In some adaptations of the technique the dead time is selected to be less than the detected muzzle flash duration (or a predetermined part of the detected muzzle flash duration, such as one tenth). In particular, the technique may be adapted to use dead time under a millisecond. The desired dead time can be set by an appropriate shutter scheme, for example by a rolling shutter.

The technique of the inventors allows detection of muzzle flashes in a relatively wide PDA field of view or per pixel field of view. Consider, for example, a muzzle flash occurring at a certain distance that gets projected on a pixel. The same muzzle flash occurring further from the imager will then be projected on a spot smaller than a pixel; and the pixel then will generally collect more clutter and less signal (in particular because a smaller portion of signal will propagate towards the imager and because this smaller portion will undergo more absorption in the atmosphere). This will result in a lower signal to clutter ratio and a lower chance of successful muzzle flash detection. Thus, for a desired distance of detection a pixel should not collect light from a too broad region. Though, it can be concluded that the projection spot for a muzzle flash may be smaller than a pixel (in one or two dimensions) and yet allow detection, if optical resolution allows.

It should be noted, that the useful number of pixels is tied with various factors such as the photodetector architecture and the complexity of processing used for detection. Thus, the useful field of view of an exemplary PDA's pixel and the field of view of the photodetector itself depend on a type of detection being implemented. The field of view of a single pixel may be selected to be relatively wide, so as to correspond, for example, to the size of a muzzle flash occurring at a distance smaller than a few tens of meters. Typically, muzzle flash would occur at a distance larger than that, and would cover area smaller than a pixel. In accordance with the above, when muzzle flash occurs, the pixel signal would be a sum of a signal due to the background and of a signal due to the muzzle flash. The background typically changes slowly, so if a fast change in the total pixel signal is detected, this makes the pixel a candidate for the processing aimed at checking muzzle flash occurrence. The wider the pixel's field of view, the smaller the relative part of the muzzle flash signal in the total pixel signal, for the desired range of detection. Therefore, there is a trade-off between the achievable range and pixel field of view. While the desired range is achieved, the total field of view can be increased by increasing a number of pixels in the detector. The increased total field of view is preferred when it is desired to detect shots from as many directions as possible. However, using a too large pixel count might require too expensive optical and computational hardware, and too much power for operation. In some adaptations of the technique of the inventors the divergence angle of the field of view of a single pixel is selected to be between 0.1 and 0.2 degrees, or between 0.2 and 0.5 degrees, or larger than 0.5 degrees. In some adaptations of the technique the field of view of the photodetector is selected to be between 30 and 50 degrees, or between 50 and 90 degrees, or larger than 90 degrees, in at least one dimension. The desired field of view may be created by appropriate optics with a focal length selected to project the field of view on the detector surface.

The technique of the inventors may advantageously utilize acquiring multipixel images of scenery. In some adaptations of the technique the imager is selected to have between 10,000 and 100,000 pixels, or between 100,000 and 1,000,000 pixels, or it may be suitably more than 1,000,000 pixels. Using the multipixel imaging, muzzle flash locating may be performed relatively accurately and precisely. The muzzle flash lateral location is, to a large degree, determined by the imaged direction of a pixel or group of pixels which detected the muzzle flash. The muzzle flash longitudinal location is, to a large degree, determined by the intensity of the received signal and shape of the pixel group which detected the muzzle flash.

The muzzle flash detecting processing, which particular example is parallel processing, may be performed by a unit configured to apply such operations to the pixels outputs as single or multiple (in particular double) signal differentiating, peak detecting, band-pass filtering, match filtering and/or other operations aimed at selecting or detecting muzzle flash type signal(s) from the detected signals. An output signal obtained as a result of a single pixel processing (e.g. an output signal of obtained from a pixel of the parallel processing unit) may be interpreted for estimating likelihood that the corresponding PDA pixel has detected a muzzle flash. For example, the likelihood may be contained in the output of the match filter. If the likelihood is larger than a certain threshold, the event may be interpreted as a muzzle flash or a candidate muzzle flash, and a signal (alarm) intended to inform an operator or a user about the shot may be produced, or a candidate alarm may be transferred to a next layer or stage of processing.

As it has been mentioned above, the processing unit can be organized in layers or stages. The filtering performed by one stage of the muzzle flash selecting processing unit can effectively reduce an amount of data for processing to be performed at further stages, thus allowing to apply to the reduced amount of data a more complex processing and to reduce requirements for the technical characteristics needed at a particular stage of the muzzle flash detector. In some embodiments of the technique of the inventors, the processing is performed in stages, with a parallel stage aimed at analyzing time-dependences of pixels outputs being the first or one of the first stages. The parallel layer of processing can be combined with a module for selection of pixels which most likely detected muzzle flash. A further (e.g. the second) stage thus can receive a list of candidate pixels from the module. This further layer of processing then may process this pixel list, by obtaining from a corresponding memory unit data needed for reestimation of likelihoods of muzzle flash event for pixels from the list. The data needed for reestimation may include historical data of pixels from the list and historical data of pixels situated close to the pixels from the list. The historical data may include previously generated outputs of various processing stages, pixel selection modules, and of the PDA. The historical data, before they are stored in the memory, may be compressed. For example, PDA outputs may be divided so that one replica will follow to the first layer of processing and another replica(s) will follow to a compression module(s) and then to a memory unit(s). Thus, the memory unit can be used to store historical data for all pixels.

Likewise, the data to be used for reestimation may be or include data obtained after a candidate event, in addition to the historical data, as the processing does not have to be immediate, and in fact may benefit from taking into account information gathered after the candidate event had occurred. In this case, to obtain the same quality of detection, the memory unit may be used to store only a portion of volume of the historical data, because the data may be gathered more intelligently when the candidate pixels are known.

The staged (layered) processing allows decreasing power consumption of the detector and weight of the needed power supply and increases a maximum allowed input data bandwidth (e.g. number of pixels in the PDA and the breadth of the field of view) and the portability of the detector.

Layer(s) of processing may be combined by such pixel selection utilities, as Constant False Alarm Rate module(s) (CFAR modules), which confirm/suppress the candidate alarms for the same number of suspicious pixels per frame (or a certain number of pixels of the PDA) or time interval. The use of CFAR technique allows not to jam a net processing stage of the detection system, but to keep maximal probability of muzzle flash detection. The CFAR module is one of possible pixel selection modules.

The parallel processing can include parallel analog in-pixel signal processing done by a corresponding processing (sub) unit. The parallel analog processing unit can be based, for example, on the hybrid detector technology not requiring compromising in-pixel processing power or array fill factor. In some embodiments the fill factor of the PDA is between 60% and 75%, in some other it is between 75% and 90%; in some other embodiments it is higher than 90%. The fill factor may be also outside of the specified regions, however, typically, the higher the fill factor, the higher the chance of muzzle flash detection for remote muzzle flashes. In particular, close to 100% fill factor almost eliminates the chance that the remote muzzle flash will be projected on the dead area (where the PDA is not sensitive). In addition, even for not so remote muzzle flashes, the higher is the fill factor, the higher is the collectable signal. The hybrid detector can be fabricated as a Read Out Integrated Circuit (ROIC) with in-pixel signal processing flip-chip bonded to photodiode or other photodetector array.

The parallel in-pixel signal processing may also be done in a separate electronics module (not in the ROIC). The parallel processing of the PDA pixels' outputs can include analog-to-digital conversion and processing of the digital data by a field programmable gate array (FPGA). The term parallel should be distinguished from simultaneous in the context of the present application: the parallel processing can be either simultaneous or not. If pixels' outputs are processed independently of each other, such processing is parallel, independently on order in which their processing is performed. The parallel processing is parallel to an extent allowed by crosstalk.

After the first, time-dependence analyzing and possibly parallel, layer or stage of processing, there may be other layers of processing, further testing pixels for presence of gunshot events. For example, a second (or further) layer of processing may be configured to operate in the following way. It may select and analyze one or several candidate or suspicious events, i.e. signals coming from pixels which have been determined by the first layer processing, for example including a CFAR module, to have high likelihood of detecting muzzle flash events. For each of the suspicious pixels (candidate pixels) the second layer of processing reestimates the likelihood that this pixel detected a muzzle flash. Since the second layer analyzes a smaller dataset that the first layer, it may use more sophisticated algorithms or processing, requiring higher computing time and power per pixel, to better distinguish between muzzle flash, noise and clutter. For this purpose, the second layer of processing may use signals obtained from neighboring or close pixels and/or signals obtained at close time moments. For example, the second layer may be configured to check whether an event is repeated for several adjacent or close pixels and propagates along a straight line on the PDA. If the case is such, the source of the moving event (i.e. of a sequence of events) may be identified as a moving object rather than a muzzle flash. Thus the invented detection system eliminates events lasting too long time or passing too long distance: for example, level-1 may eliminate most of the events lasting too long within one pixel over time, while level-2 may eliminate events lasting too long in the entire frame, though lasting for a relatively short time in each of the involved pixels. The closeness or relative location in space of the involved pixels allows inferring that the sequence of events is not a sequence of the independent events, but a single moving event.

The second layer of processing may be fed with data in the Constant False Alarm Rate regime and confirm/suppress the candidate events/alarms for a constant predetermined number of suspicious pixels without jamming the detection system. The confirmed alarms can be passed to an operator or a user of the detection system (e.g. by an optical signal or a sound).

The reasons why some of the preferred embodiments of the invented technique use at least two layers of signal processing can be illustrated by the following consideration. The system of the invention may need to make for example of decisions per second. This number is obtained assuming a frame rate of 500 per second and a PDA of 200,000 pixels. The inventors assumed that a final false alarm rate (FAR) of not less than approximately ⅓ hours is desired. Then, only one false alarm is allowed in every decisions. In such a case, if one would apply the most sophisticated algorithm or processing to each of the pixels all the time (at the PDA frame rate), the algorithm would use a lot of computing power. Thus, to save the power, the inventors in some cases choose to split the processing into layers, to utilize more efficient computing power scheme.

In some of the embodiments the reduction of data bandwidth is 3-9 orders of magnitude per layer. The reduction of data bandwidth can be understood as a reduction of number of potential alarms: the layers reduce their number from the original pixel rate (number of pixels in PDA times the sampling rate) to the maximum allowed FAR. The layers may eliminate also true events, however the probability of detection (Pd) is kept high. For example, detection with a probability of success of over 80% and allowed FAR of not more than 1 per 3 hours (i.e. approximately 1 per 104 seconds) may be considered. By utilizing a PDA with 2×105 pixels and frame rate of 500 per second, a designed detection system obtained 2×105×500=108 samples per second. Accordingly, the specified FAR corresponded to 1 false alarm per 1012 sampled pixels. The first layer detected at least 90% of true events, and falsely detected muzzle flash in average in 1 case per 105 sampled pixels (i.e. defined some pixel as a candidate while that pixel did not correspond to the muzzle flash). The designed second layer detected at least 90% of true events, and falsely detected muzzle flash in average in 1 case per 107 sampled pixels. The combined performance of the system therefore was characterized by the probability of detection of 81% (90% times 90%) and the FAR of 10-4 s-1 (10-5×10-7× (2×105)×500 s-1).

In accordance with the above, in some embodiments, the second layer receives data from the first layer through a CFAR utility, structurally included either into the first layer or the second layer and selecting a constant number of the most suspicious events for processing in the rest of the second layer. Selecting more suspicious events than the second layer can handle would create an overflow, e.g. a fail of a cycle. Selecting too few events would increase the FAR. Operating in its normal mode, the second layer further reduces the FAR, to the maximal allowed level. For example, the first layer may reduce the data rate from the pixel rate of about/sec to about/sec and the second layer may reduce the FAR to a desired/sec, which is 7 additional orders of magnitude. In some preferred embodiments the decrease in the number of candidate events due to the first, in particular parallel, layer is smaller than the decrease in the number of candidate events due to a further layer (e.g. the second layer).

In this connection it should be understood, that the layered architecture can facilitate detection of very short events, such as muzzle flashes, while it the technique of the inventors is aimed at operation with a high rate (decision-making rate) and an efficient power use scheme.

The technique of the inventors may combine detection in different spectrums, such as SBUV or visible, by using one or more PDAs sensitive to one or more wavelengths. For example, the detection of the flash intensities corresponding to different wavelengths can be done with one detector using time and/or pixel multiplexing. In particular, a secondary visible light or NIR imaging can serve for independent detecting of muzzle flashes and for reducing the false alarm rate (FAR) of a prime (in this example SWIR) imaging by confirming or suppressing suspicious events. In other words, the results of the prime imaging may be verified by the results of secondary imaging.

Also, visible light or NIR imaging can serve for deduction of the background by subtraction of images, because, for example, in daylight the muzzle flash is stronger in the SWIR range, while the background is stronger in NIR or Visible light.

The muzzle flash detector may be incorporated into a gunshot detection system also including an acoustic or any other gunshot detector. Such a system can perform concurrent detection of the muzzle flash and of some other (e.g. acoustic or SBUV) signal associated with the gunshot, e.g. of muzzle blast and/or bullet shock wave. This double (e.g. optic/acoustic) detection scheme is aimed at decreasing the FAR and increasing the ratio of probability of gunshot detection (PD) to the FAR. The user is notified about the gunshot only if both optical detector and the acoustic detector identify a gunshot (i.e. if the optical detector "suspicion" or alarm is confirmed by the acoustic detector within a short period of time needed for sound to cover the distance to the user).

In some of the preferred embodiments the inventors' system includes or is associated with a control unit configured for at least one of the following: for processing the output signals of the parallel processing unit for confirming/suppressing the possible alarms by constructing information contained in spatial and/or temporal features of the detected optical signal(s); for processing signals obtained from multiple detectors (e.g. optical, such as PDA, or acoustic, or two optical for different wavelength ranges) for confirming/suppressing the possible alarms and/or for determining a distance to the flash; for defining the PDA working parameters and/or parallel processing parameters based on external conditions (e.g. weather, lighting); for determining a weapon used by the shooter (e.g. by comparing the detected data with reference indicative of different muzzle flashes signatures, or by measuring the time between muzzle flashes in case of bursting fire). In accordance with the above, the control unit may be configured to implement the second and/or further layers of processing. Thus, the control unit facilitates the detection of a muzzle flash event.

The technique of the inventors may be aimed at a high capability of use by a human having a restricted immediate access to various carrying equipments, for example a soldier or a policeman. To this end, weight of some of the embodiments may be selected to be between 1 kg to 3 kg, or between 0.3 to 1 kg, or lighter than 0.3 kg. Such selection is facilitated, when the PDA does not require a cooler, in particular a cryogenic cooler (e.g. Stirling cooler), and a relatively heavy portable power source for feeding the cooler (consequently, the system may need only a relatively portable light power source). This relates to the above references to the range of the PDA working temperatures. In fact, some of the inventors' technique's adaptations are configured to employ a working temperature as of natural environment (or slightly larger, due to heat dissipation in the device). However, it should be understood, that the high portability is not a requirement; the system may be heavy, especially when it becomes necessary due to other reasons, for example when the system needs to be shielded and/or when the system needs to stay operative for long periods of time and thus requires a highly capacitive power source. For another example, the system may be stationary mounted for constantly observing a desired scenery, which may be a subway station, or a street with governmental offices, or any place where a terrorist or bandit attack might be expected, and therefore it may not need portability. Likewise, the inventors' system may be mounted on a tank, or a car, or a bus, etc. The system may be fed with a constant power supply, similarly to a home lamp or a desktop computer, and it may be configured to utilize a MWIR/LWIR imager and a cooler and benefit from a stronger muzzle flash MWIR signal. However, the inventors have realized that the latter MWIR/LWIR imager and a cooler are not necessary, and do not have to be utilized when the relatively high portability is desired. Contemplating on the latter case, the inventors have found that the portability may be increased, when the system of the invention is more specifically configured for a specific mission. The inventors have considered that for some missions, the mission duration is typically between 6-12 hours, while for some other missions the duration may be between 1 and 6 hours, or between 12 and 24 hours, or longer than 24 hours. In fact, the expected mission duration depends on a scenario, which caused the need to use the inventors' system, on the scenery, the length of the day in the season, the capabilities of the system's user to stay in engagement or to replace or recharge the portable power supply. Thus, as the inventors have found, the capacity of the portable power supply may be selected so as to provide the system a desired operative duration, for example in one of the ranges of the mission duration above. The power supply, if it is light, may provide enough electricity even for a larger number of hours. In particular, the capacity of the portable power supply (e.g. an accumulator or a battery) may be less than 0.1 W, or between 0.1-1 W and between 1-10 W or larger than 10 W. It should be understood, that modern muzzle flash detecting devices are typically equipped with power supplies of more than a 50 W capacity and therefore have a reduced portability, if at all.

Additionally, it should be noted, that the allowed weight of the system may be a decreasing function of the expected mission duration, because the user may need to carry additional supplies (e.g. food, water, bullets) with him or her to the mission, and the total weight may be limited. Therefore, for some embodiments the inventors select the capacity of the power supply and the system weight not independently, but in combination. This way, a relatively high portability and a relatively high usability of the device of the inventors can be achieved.

In this connection, it is reiterated, that in accordance with the features of the invention herein presented, the technique of the inventors can be effectively utilized for detection not only of muzzle flashes, but also for detection of other flashes and short events, for example of strobe light sources, pulses lasers, lightnings, antitank missile launchers, and shell firings.

According to a broad aspect of the invention, there is provided a method for use in detection of a muzzle flash event. The method may include one or more of the following:

(a) focusing on a Photo Detector Array (PDA) electromagnetic radiation, being at least partially within the near infrared (NIR) and short wave infrared (SWIR) spectrum;

(b) focusing on a pixel of a PDA electromagnetic radiation from a relatively large pixel field of view (FOV);

(c) acquiring multipixel images of a scenery by a PDA, comprising a relatively large number of pixels;

(d) focusing on a PDA electromagnetic radiation from a relatively large field of view;

(e) filtering electromagnetic radiation so as to allow sensing by a PDA of substantially a spectral range corresponding to relatively low light transmission in atmosphere;

(f) sensing by a PDA electromagnetic radiation, being at least partially within the near infrared (NIR) and the short wave infrared (SWIR) spectrum;

(g) using a relatively small integration time for sensing electromagnetic radiation by a PDA;

(h) using a relatively small dead time for sensing electromagnetic radiation by a PDA;

(i) multiplexing pixel signals originating from a PDA into at least two replicas;

(j) recording a replica of pixel signals originating from a PDA into a memory;

(k) applying a processing to pixel signals originating from a PDA, the processing being adapted for use in selection of candidate pixels, whose signals are substantially similar to the temporal-spatial signature (i.e. temporal and/or spatial) of muzzle flash;

(l) utilizing a relatively portable system for the detection;

(m) utilizing a relatively low capacity portable power supply for the detection;

(n) using a PDA at a temperature equal to or higher than a temperature of natural environment for the detection;

(o) not utilizing a cooler for a PDA being used for the detection;

(p) focusing on a Photo Detector Array (PDA) electromagnetic radiation wherein the focusing is optimized for an object distance less than 50 meters;

(q) using a Photo Detector Array (PDA) with a fill factor larger than 60%.

According to a broad aspect of the invention, the processing for the detection of a muzzle flash event may include at least one of the following:

(a) eliminating spatial background portion from the pixel signals;

(b) eliminating relatively slowly changing portions from the pixel signals;

(c) selecting pixel signals' portions substantially similar to the temporal signature of muzzle flash;

(d) and analog processing of time dependence of the pixel signals, the processing being adapted to generate substantially an estimate of likelihood that a pixel detected muzzle flash;

(e) a parallel processing of time dependence of the pixel signals, the processing being adapted to generate substantially an estimate of likelihood that a pixel detected muzzle flash;

(f) a digital processing of a time dependence of the pixel signals, the processing being adapted to generate substantially an estimate of likelihood that a pixel detected muzzle flash;

(g) selecting the candidate pixels by comparing a substantial estimate of likelihood that a pixel detected muzzle flash with a threshold common for a plurality of operating pixels;

(h) selecting the candidate pixels by comparing an estimate of likelihood that a pixel detected muzzle flash with a threshold obtained using replicas of the pixel signals;

(i) selecting substantially the same number of the candidate pixels from subsequent frames;

(j) at least two processing stages, a later of the stages applying a processing for the selection of the candidate pixels to a smaller number of the pixels than an earlier of the stages;

(k) at least two processing stages, a later of the stages applying, to the pixels, a processing for the selection of the candidate pixels, using more processing time per pixel than an earlier of the stages;

(l) selecting, as the candidate pixels, those of the pixels, whose signals together with their vicinity pixels' signals present substantially the spatial signature of muzzle flash;

(m) eliminating from the selection those of the pixels, whose signals together with their vicinity pixels' signals present substantially the temporal-spatial signature of a moving light source;

(n) confirming, as the candidate pixels, those of the pixels, whose signals together with their vicinity pixels' signals, obtained after their initial selection of the candidate pixels, increase an estimate of likelihood that a pixel detected muzzle flash;

(o) eliminating from the selection those of the pixels, whose signals are not accompanied by an acoustic signal with a signature substantially similar to the signature of a shot.

The electromagnetic radiation being focused on the Photo Detector Array (PDA) may in part or in whole be within the NIR spectrum. In particular, it can be fully within the NIR spectrum. It can also be at least partially within the SWIR spectrum. In particular, it can be fully within the SWIR spectrum.

In some embodiments, the focusing is optimized for an object distance larger than 50 meters (i.e. the distance from the muzzle flash to the detection device). In some embodiments, the focusing is optimized for an object distance less than 50 meters.

The relatively large pixel field of view (FOV) may be between 0.1 and 0.2 degrees, or between 0.2 and 0.5 degrees, or it may be larger than 0.5 degrees.

The device's PDA may include a relatively large number of pixels. The relatively large number of pixels may be between 10,000 and 100,000 pixels, or between 100,000 and 1,000,000 pixels, or it may be more than 1,000,000 pixels.

The relatively large field of view may be between 30 and 50 degrees, or between 50 and 90 degrees, or it may be larger than 90 degrees.

The filtering may be performed in the spectral range at least partially including the trough of low atmospheric light transmission situated around 1.15 μm. Additionally or alternatively, it may be performed in the spectral range at least partially including the trough of low atmospheric light transmission situated around 1.39 μm; the trough of low atmospheric light transmission situated around 1.9 μm; the trough of low atmospheric light transmission situated around 2.7 μm.

The sensed by the PDA electromagnetic radiation may be at least partially within the NIR spectrum. In particular it may be fully within the NIR spectrum. It may be at least partially within the SWIR spectrum. It may be fully within the SWIR spectrum.

The PDA may be a CMOS PDA. Also, it may be an intracavity PDA.

The PDA integration time may be between $10^{-2}$ s and $5.0 \cdot 10^{-3}$ s, or between $5.0 \cdot 10^{-3}$ s and $2.0 \cdot 10^{-3}$ s, or between $2.0 \cdot 10^{-3}$ s and $5.0 \cdot 10^{-4}$ s, or between $5.0 \cdot 10^{-4}$ s and $10^{-4}$ s, or it might be less than $10^{-4}$ s.

The PDA dead time may be shorter than 1 millisecond.

The replicated pixel signals may be compressed before the recording.

The processing for the detection of a muzzle flash, while including eliminating relatively slowly changing portions from the pixel signals, may include at least one differencing the pixel signals. In particular it may include the second order differencing of the pixel signals.

The processing may include selecting pixel signals' portions substantially similar to the temporal signature of muzzle flash. Such portions for selection may be pulses in the form of a peak. The peak to be selected may be of a predetermined duration.

The analog processing adapted to generate substantially an estimate of likelihood that a pixel detected muzzle flash may include at least one differencing of the pixel signals. In particular, it may include the second order differencing of the pixel signals. It may include passing the pixels signals through a matched filter, adapted to match the temporal signature of muzzle flash. The substantial estimate may be a voltage potential at an output of an analog circuit performing the analog processing.

The selecting candidate pixels by comparing an estimate of likelihood that a pixel detected muzzle flash with a threshold may use common threshold within at least two groups of adjacent pixels, while threshold may be varying between the groups.

According to a broad aspect of the invention, there is provided a device for use in detection of a muzzle flash event. The device may include a PDA and one of the following features:

(a) optics adapted to focus on the PDA electromagnetic radiation being at least partially within the near infrared (NIR) and short wave infrared (SWIR) spectrum;

(b) optics adapted to focus on a pixel of the PDA electromagnetic radiation from a relatively large pixel field of view (FOV);

(c) optics adapted to focus on the PDA electromagnetic radiation from a relatively large field of view;

(d) a filter of electromagnetic radiation accommodated so as to allow sensing by said PDA of substantially a spectral range corresponding to relatively low light transmission in atmosphere;

(e) a shutter, allowing to use a relatively small integration time for sensing electromagnetic radiation by the PDA;

(f) a shutter controller, adapted to define a relatively small dead time for sensing electromagnetic radiation by the PDA;

(g) a multiplexer, adapted to divide pixel signals originating from the PDA into at least two replicas;

(h) a memory, storing a replica of pixel signals originating from the PDA;

(i) a processing unit adapted to process pixel signals originating from the PDA, the unit being adapted for use in selection of candidate pixels, whose signals are substantially similar to the temporal-spatial (i.e. temporal and/or spatial) signature of muzzle flash;

(j) a portable power supply, configured to provide the device with electricity for a relatively short time of the device operation.

The device's shutter may be an electronic shutter. The shutter controller may utilize a rolling shutter scheme for operating the shutter.

The device's PDA may be sensitive within a part or the whole of the NIR and SWIR spectrum, or of the NIR spectrum, or of the SWIR spectrum.

The device's relatively large pixel field of view (FOV) may be between 0.1 and 0.2 degrees, or between 0.2 and 0.5 degrees, or larger than 0.5 degrees.

The device's relatively large number of pixels may be between 10,000 and 100,000 pixels, or between 100,000 and 1,000,000 pixels, or more than 1,000,000, pixels.

The device's relatively large field of view may be between 30 and 50 degrees, or between 50 and 90 degrees, or larger than 90 degrees.

The device's spectral range may include a part or the whole of the trough of low atmospheric light transmission situated around 1.15 µm. As well, it may include a part or the whole of the trough of low atmospheric light transmission situated around 1.39 µm, and/or the trough of low atmospheric light transmission situated around 1.9 µm, and/or the trough of low atmospheric light transmission situated around 2.7 µm.

The device's PDA may be at least partially sensitive within the NIR spectrum. the PDA may be sensitive only within the NIR spectrum. The PDA may be at least partially sensitive within the SWIR spectrum. The PDA may be sensitive only within the SWIR spectrum.

The device's PDA may be a CMOS PDA. The PDA may be an intracavity PDA.

The PDA integration time may be between 10-2 s and 5.0·10-3 s, or between 5.0·10-3 s and 2.0·10-3 s, or between 2.0·10-3 s and 5.0·10-4 s, or between 5.0·10-4 s and 10-4 s, or it might be less than 10-4 s.

The device's PDA dead time may be lower than a millisecond.

The processing unit may be in-pixel.

The device may include a compressing unit accommodated to compress a replica of the pixel signals.

The device may be configured to have a relatively low weight.

According to another broad aspect of the invention, there is provided a processing unit for use in detection of a muzzle flash event. The processing unit may be adapted to process pixel signals originating from a PDA, and adapted for use in selection of candidate pixels, whose signals are substantially similar to the temporal-spatial signature of muzzle flash. The processing unit may be also adapted to perform at least one of the following:

(a) eliminating spatial background portion from the pixel signals;

(b) eliminating relatively slowly changing portions from the pixel signals;

(c) selecting pixel signals' portions substantially similar to the temporal signature of muzzle flash;

(d) selecting the candidate pixels by comparing a substantial estimate of likelihood that a pixel detected muzzle flash with a threshold common for a plurality of operating pixels;

(e) selecting the candidate pixels by comparing an estimate of likelihood that a pixel detected muzzle flash with a threshold obtained using replicas of the pixel signals;

(f) selecting substantially the same number of the candidate pixels from subsequent frames;

(g) selecting, as the candidate pixels, those of the pixels, whose signals together with their vicinity pixels' signals present substantially the spatial signature of muzzle flash;

(h) eliminating from the selection those of the pixels, whose signals together with their vicinity pixels' signals present substantially the temporal-spatial signature of a moving light source;

(i) confirming, as the candidate pixels, those of the pixels, whose signals together with their vicinity pixels' signals, obtained after their initial selection of the candidate pixels, increase an estimate of likelihood that a pixel detected muzzle flash.

(j) eliminating from the selection those of the pixels, whose signals are not accompanied by an acoustic signal with a signature substantially similar to the signature of a shot.

The processing unit for use in detection of a muzzle flash event may include at least one of:

(a) an analog processing unit, adapted to apply analog processing to time dependence of the pixel signals, so as to generate substantially an estimate of likelihood that a pixel detected muzzle flash;

(b) a parallel processing unit, adapted to apply parallel processing to time dependence of the pixel signals, so as to generate substantially an estimate of likelihood that a pixel detected muzzle flash;

(c) a digital processing unit, adapted to apply digital processing to time dependence of the pixel signals, so as to generate substantially an estimate of likelihood that a pixel detected muzzle flash;

(d) at least two processing stages, a later of the stages applying a processing for the selection of the candidate pixels to a smaller number of the pixels than an earlier of the stages;

(e) at least two processing stages, a later of the stages applying, to the pixels, a processing for the selection of the candidate pixels, using more processing time per pixel than an earlier of the stages.

In the processing unit, the eliminating of background portions may include determining scene motion vectors.

In the processing unit, the eliminating relatively slowly changing portions from the pixel signals may include at least one differencing of the pixel signals. The differencing may be second order differencing of the pixel signals.

In the processing unit, selecting candidate pixels by comparing an estimate of likelihood that a pixel detected muzzle flash with a threshold may include selecting a pulse in the form of a peak. The peak may be of a predetermined duration.

The analog processing unit may include a circuit configured for performing at least one differencing of the pixel signals. The circuit may be configured for performing the second order differencing of the pixel signals.

The analog processing unit may include a matched filter, accommodated on a pass of the pixels signals, the matched filter being adapted to match the temporal signature of muzzle flash.

The analog processing unit, adapted to apply analog processing to time dependence of the pixel signals so as to generate substantially an estimate of likelihood that a pixel detected muzzle flash may be adapted to generate the substantial estimate as a voltage potential at an output of the analog processing unit.

The processing unit may use common thresholds within at least two groups of adjacent pixels, the thresholds differing between the groups.

According to a broad aspect of the invention, there is provided a device for use in detection of a muzzle flash event, the device including a PDA, relatively highly sensitive in at least a portion of the NIR and SWIR spectrum, and a filter of electromagnetic radiation, selectively passing substantially a spectral range corresponding to relatively low light transmission in atmosphere.

According to a broad aspect of the invention, there is provided a device for use in detection of a muzzle flash event, the device including a PDA, having a cutoff wavelength lower than 3 microns, and a readout circuit for the PDA, the circuit being configured and operable to sample each operating pixel of the PDA more than 500 times per second.

According to a broad aspect of the invention, there is provided a device for use in detection of a muzzle flash event, the device including a PDA, having a cutoff wavelength shorter than 3 microns, and a processing unit adapted to detect muzzle flash events in an output of said imaging arrangement.

According to a broad aspect of the invention, there is provided a device for use in detection of a muzzle flash event, the device including a PDA, sensitive in at least a portion of the NIR and SWIR spectrum; a filter of electromagnetic radiation selectively passing substantially a spectral range corresponding to relatively low light transmission in atmosphere; the PDA being configured to operate with a relatively small integration time for sensing electromagnetic radiation. The device may include a processing unit adapted to process pixel signals originating from the PDA, the unit being adapted for use in selection of candidate pixels, whose signals are substantially similar to the temporal-spatial signature of muzzle flash.

According to a broad aspect of the invention there is provided a method for use in detection of a muzzle flash event, the method including sensing, by a Photo Detector Array (PDA) which is sensitive in at least a portion of the NIR and SWIR spectrum, electromagnetic radiation, passed through a filter of electromagnetic radiation selectively passing in the portion a spectral range of low atmospheric transmission, the sensing having an integration time shorter than a duration of the muzzle flash event.

According to a broad aspect of the invention there is provided a method for use in detection of a muzzle flash event, the method including sensing, by a Photo Detector Array (PDA), sensitive in at least a portion of the NIR and SWIR spectrum, electromagnetic radiation, passed through a filter of electromagnetic radiation selectively passing in the portion a spectral range of low atmospheric transmission, the sensing having an integration time shorter than 10-2 s.

According to a broad aspect of the invention there is provided a method for use in detection of a muzzle flash event, the method including sensing by a Photo Detector Array (PDA) electromagnetic radiation, passed through a filter of electromagnetic radiation selectively passing a spectral range of low atmospheric transmission and focused on the PDA, a per pixel field of view (FOV) of the PDA being larger at the focusing distance than the muzzle flash.

The focusing distance may be larger than 50 m.

According to a broad aspect of the invention there is provided a method for use in detection of a muzzle flash event, the method including sensing by a Photo Detector Array electromagnetic radiation, passed through a filter of electromagnetic radiation selectively passing a spectral range of low atmospheric transmission and focused on the PDA, a per pixel field of view (FOV) of the PDA being larger than 0.1 degrees.

The Photo Detector Array may be sensitive in at least a portion of the NIR and SWIR spectrum.

According to a broad aspect of the invention there is provided a method for use in detection of a muzzle flash event, the method including sensing electromagnetic radiation by a Photo Detector Array (PDA) sensitive in at least a portion of the NIR and SWIR spectrum, the sensing recurring with a dead time shorter than a duration of the muzzle flash.

The dead time may be shorter than the one tenth of the duration.

According to a broad aspect of the invention there is provided a method for use in detection of a muzzle flash event, the method including sensing electromagnetic radiation by a Photo Detector Array (PDA) sensitive in at least a portion of the NIR and SWIR spectrum, the sensing recurring with a dead time shorter than one millisecond.

According to a broad aspect of the invention there is provided a method for use in detection of a muzzle flash event, the method including sensing electromagnetic radiation by a Photo Detector Array (PDA) sensitive in at least a portion of the NIR and SWIR spectrum and multiplexing pixel signals of the PDA into at least two replicas.

According to a broad aspect of the invention there is provided a method for use in detection of a muzzle flash event, the method including sensing, by a Photo Detector Array (PDA), electromagnetic radiation, passed through a filter of electromagnetic radiation selectively passing a spectral range of low atmospheric transmission, and multiplexing pixel signals of the PDA into at least two replicas. The method may include recording a replica of the pixel signals into a memory.

According to a broad aspect of the invention there is provided a method for use in detection of a muzzle flash event, the method including sensing, by a Photo Detector Array (PDA) sensitive in at least a portion of the NIR and SWIR spectrum, electromagnetic radiation, passed through a filter of electromagnetic radiation selectively passing in the portion a spectral range of low atmospheric transmission, the PDA having a fill factor larger than 60%. The fill factor may be between 60% and 75%. The fill factor may be between 75% and 90%. The fill factor may be higher than 90%.

According to a broad aspect of the invention there is provided a method for use in detection of a muzzle flash event, the method including sensing electromagnetic radiation by a Photo Detector Array (PDA) sensitive in at least a portion of the NIR and SWIR spectrum, and detecting the muzzle flash in output of the PDA by applying a signal processing to pixel signals of the PDA.

According to a broad aspect of the invention there is provided a method for use in detection of a muzzle flash event, the method including sensing by a Photo Detector Array (PDA) electromagnetic radiation passed through a filter of electromagnetic radiation selectively passing a spectral range of low atmospheric transmission, and detecting the muzzle flash in output of the PDA by applying a signal processing to pixel signals of the PDA.

According to a broad aspect of the invention there is provided a method for use in detection of a muzzle flash event, the method including sensing electromagnetic radiation by a Photo Detector Array (PDA) sensitive in at least a portion of the NIR and SWIR spectrum, and selecting candidate pixels by applying a stage of processing to pixel signals of the PDA, the stage being configured to provide a stage data rate decrease factor smaller than a data rate decrease factor between an initial data rate of the PDA and an alarm rate benchmark of 100 alarm/s. The benchmark is an estimate of a maximum shooting rate that may be caused by a single shooter. This estimate is not limiting for embodiments which are not specifically adjusted in view of this benchmark.

According to a broad aspect of the invention there is provided a method for use in detection of a muzzle flash event, the method including sensing by a Photo Detector Array (PDA) electromagnetic radiation passed through a filter of electromagnetic radiation selectively passing a spectral range of low atmospheric transmission, and selecting candidate pixels by applying a stage of processing to pixel signals of the PDA, the stage being configured to provide a stage data rate decrease factor smaller than a data rate decrease factor between an initial data rate of the PDA and an alarm rate benchmark of 100 alarms/s.

The stage data rate decrease factor may be smaller than 20 multiplied by a square root of the data rate decrease factor between the initial data rate of PDA and the alarm rate benchmark.

The processing may include comparing pixel signals of the PDA with a temporal-spatial signature of the muzzle flash.

The processing may include eliminating spatial background portion from the pixel signals. The processing may include eliminating substantially slowly changing portions from the pixel signals. The eliminating may include at least one differencing of the pixel signals. The eliminating may include second order differencing of the pixel signals.

The processing may include selecting pixel signals' portions substantially similar to a temporal signature of the muzzle flash. The selecting may include selecting a pulse having a form of a peak. The peak may be of a predetermined duration.

The processing may include an analog processing of time dependence of the pixel signals. The analog processing may include at least one differencing of the pixel signals. The analog processing may include second order differencing of the pixel signals. The analog processing may include passing the pixels signals through a matched filter, adapted to match the temporal signature of muzzle flash. The analog processing may provide a voltage potential at an output, the voltage potential being indicative of an estimate of likelihood of a detection of the muzzle flash.

The processing may include a parallel processing of time dependence of the pixel signals.

The analog processing may be adapted to generate substantially estimates of likelihood that a respective to the estimate pixel has detected the muzzle flash.

The parallel processing may be adapted to generate substantially estimates of likelihood that a respective to the estimate pixel has detected the muzzle flash.

The processing may include a digital processing of time dependence of the pixel signals.

The digital processing may be adapted to generate substantially estimates of likelihood that a respective to the estimate pixel has detected the muzzle flash.

The processing may include selecting candidate pixels by comparing, for a plurality of pixels, substantial estimates of likelihood that a respective to the estimate pixel has detected the muzzle flash with a likelihood threshold being common for a plurality of pixels. The threshold may be the same within each of two or more groups of adjacent pixels and different between the groups.

The processing may include selecting candidate pixels by comparing, for at least one pixel, an estimate of likelihood that the pixel has detected the muzzle flash with a likelihood threshold, obtained using a replica of the pixel signals.

The method may include selecting substantially the same number of candidate pixels from subsequent PDA frames.

The method may include utilizing at least two processing stages, a later of the stages applying a processing selecting candidate pixels to a smaller number of the PDA pixels than an earlier of the stages.

The method may include using at least two processing stages, a later of the stages selecting candidate pixels by utilizing more processing time per its candidate pixel than an earlier of the stages.

The method may include selecting into candidate pixels of pixels whose signals together with their vicinity pixels' signals present substantially a spatial signature of the muzzle flash.

The processing may include suppressing selection into candidate pixels of a pixel whose signal together with its vicinity pixels' signals present substantially a temporal-spatial signature of a substantially moving light source.

The processing may include at least two stages, the processing at a later stage including confirming selection into candidate pixels of a candidate pixel whose likelihood estimate of having detected the muzzle flash has increased at the later stage of the processing. The later stage of processing may utilize the candidate pixel's signal and candidate pixel's vicinity pixel's signals.

The processing may include suppressing selection into candidate pixels of a pixel whose signal is not accompanied by a detection of an acoustic signal with an acoustic signature substantially similar to the acoustic signature of the muzzle flash-causing event.

The method may include cooling of the PDA. The sensing may be performed at a temperature between −30° C. and a PDA ambient temperature. The sensing may be performed at a temperature higher than a PDA ambient temperature.

The sensing may be performed without cooling the PDA.

The method may include utilizing for the detection a power supply allowing more than 1 hour of the detection.

According to a broad aspect of the invention there is provided a method for use in detection of a muzzle flash event, the method including sensing, by a Photo Detector Array (PDA), sensitive in at least a portion of the NIR and SWIR spectrum, electromagnetic radiation, passed through a filter of electromagnetic radiation selectively passing in the portion a spectral range of low atmospheric transmission, the method including utilizing for the detection a power supply allowing from 1 to 24 hours of the detection.

The power supply may allow more than 6 hours of the detection.

The power supply may allow less than 12 hours of the detection.

The method may include utilizing for the detection a power supply of less than 10 Watts output power.

The method may include utilizing for the detection only equipment portable by a human during the detection. A weight of the equipment may be less than 3 kg.

The power supply may allow more than 6 hours of the detection.

The utilized sensing at least for a part may be performed within the NIR spectrum. The utilized sensing at least for a part may be performed within the SWIR spectrum. The PDA may have a sensitivity maximum at a wavelength longer than 3 microns and a sensitivity cut-off at a wavelength shorter than 5 microns. The PDA may have a sensitivity maximum at a wavelength shorter than 3 microns. The PDA may have a sensitivity cut-off at a wavelength shorter than 5 microns. The PDA may have a sensitivity cut-off at a wavelength between 1.4 μm and 1.65 μm. The PDA may have a sensitivity cut-off at a wavelength 1.65 μm and 1.8 μm. The PDA may have a sensitivity cut-off at a wavelength between 1.8 μm and 2.5 μm. The PDA may have a sensitivity maximum at a wavelength longer than 0.75 microns.

The PDA may have a region of a predominant sensitivity fully within the NIR/SWIR range, the region being a region where the sensitivity is higher than 20% of a maximum PDA's sensitivity. The predominant sensitivity may be defined as higher than 35% of a maximum PDA's sensitivity. The predominant sensitivity may be defined as higher than 50% of the maximum PDA's sensitivity. The predominant sensitivity may be defined as higher than 70% of a maximum PDA's sensitivity.

The sensing may be substantially within a range of low atmospheric light transmission at least partially including the trough situated around 1.15 μm (micron). The sensing may be substantially within a range of low atmospheric light transmission at least partially including a trough extending from 1.34 μm to 1.50 μm. The sensing may be substantially within a range of low atmospheric light transmission at least partially including a trough extending from 1.80 μm to 2.00 μm. The sensing may be substantially within a range of low atmospheric light transmission at least partially including a trough extending from 2.50 µm to 2.90 µm.

The method may include compressing a replica of pixel signals of the PDA before the recording.

According to a broad aspect of the invention there is provided a device for use in detection of a muzzle flash event, the device including a Photo Detector Array (PDA), sensitive in at least a portion of the NIR and SWIR spectrum, and a filter of electromagnetic radiation selectively passing in the portion a spectral range of low atmospheric transmission, the PDA having an integration time shorter than a duration of the muzzle flash event.

According to a broad aspect of the invention there is provided a device for use in detection of a muzzle flash event, the device including a Photo Detector Array (PDA), sensitive in at least a portion of the NIR and SWIR spectrum, and a filter of electromagnetic radiation selectively passing in the portion a spectral range of low atmospheric transmission, the sensing having an integration time shorter than $10^{-2}$ s.

According to a broad aspect of the invention there is provided a device for use in detection of a muzzle flash event, the device including a Photo Detector Array (PDA), a filter of electromagnetic radiation selectively passing a spectral range of low atmospheric transmission, and optics adapted to focus at least the spectral range on the PDA, a per pixel field of view (FOV) of the PDA being larger at the focusing distance than the muzzle flash.

According to a broad aspect of the invention there is provided a device for use in detection of a muzzle flash event, the device including a Photo Detector Array, a filter of electromagnetic radiation selectively passing a spectral range of low atmospheric transmission, and optics adapted to focus at least the spectral range on the PDA, a per pixel field of view (FOV) of the PDA being larger than 0.1 degrees.

A device for use in detection of a muzzle flash event, the device including a Photo Detector Array (PDA) sensitive in at least a portion of the NIR and SWIR spectrum, the device adapted to operate with a dead time shorter than a duration of the muzzle flash.

According to a broad aspect of the invention there is provided a device for use in detection of a muzzle flash event, the device including a Photo Detector Array (PDA) sensitive in at least a portion of the NIR and SWIR spectrum, the device adapted to operate with a dead time shorter than one millisecond.

The device may include a shutter, which may be an electronic shutter.

The device may include a shutter controller for operating a shutter with the selected dead time.

The shutter controller may utilize a rolling shutter scheme for operating the shutter.

According to a broad aspect of the invention there is provided a device for use in detection of a muzzle flash event, the device including a Photo Detector Array (PDA) sensitive in at least a portion of the NIR and SWIR spectrum and a multiplexer, adapted to divide pixel signals originating from the PDA into at least two replicas.

According to a broad aspect of the invention there is provided a device for use in detection of a muzzle flash event, the device including a Photo Detector Array (PDA), a filter of electromagnetic radiation selectively passing a spectral range of low atmospheric transmission, and a multiplexer, adapted to divide pixel signals originating from the PDA into at least two replicas.

The device may include a memory for storing a replica of the pixel signals.

According to a broad aspect of the invention there is provided a device for use in detection of a muzzle flash event, the device including a Photo Detector Array (PDA) sensitive in at least a portion of the NIR and SWIR spectrum, a filter of electromagnetic radiation selectively passing in the portion a spectral range of low atmospheric transmission, the PDA having a fill factor larger than 60%.

According to a broad aspect of the invention there is provided a device for use in detection of a muzzle flash event, the device including a Photo Detector Array (PDA) sensitive in at least a portion of the NIR and SWIR spectrum, and a processing unit adapted to detect the muzzle flash in output of the PDA by applying a signal processing to pixel signals of the PDA.

According to a broad aspect of the invention there is provided a device for use in detection of a muzzle flash event, the device including a Photo Detector Array (PDA), a filter of electromagnetic radiation selectively passing a spectral range of low atmospheric transmission, and a processing unit adapted to detect the muzzle flash in output of the PDA.

According to a broad aspect of the invention there is provided a device for use in detection of a muzzle flash event, the device including a Photo Detector Array (PDA), sensitive in at least a portion of the NIR and SWIR spectrum, and a processing unit including at least one stage of processing adapted to select candidate pixels by applying the stage to pixel signals of the PDA, the stage being configured to provide a stage data rate decrease factor smaller than a data rate decrease factor between an initial data rate of the PDA and an alarm rate benchmark of 100 alarms/s.

According to a broad aspect of the invention there is provided a device for use in detection of a muzzle flash event, the device including a Photo Detector Array (PDA), a filter of electromagnetic radiation selectively passing a spectral range of low atmospheric transmission, and a processing unit including at least one stage of processing adapted to select candidate pixels by applying the stage to pixel signals of the PDA, the stage being configured to provide a stage data rate decrease factor smaller than a data rate decrease factor between an initial data rate of the PDA and an alarm rate benchmark of 100 alarms/s.

The stage data rate decrease factor may be smaller than 20 multiplied by a square root of the data rate decrease factor between the initial data rate of the PDA and the alarm rate benchmark.

The processing unit may be adapted to compare pixel signals of the PDA with a temporal-spatial signature of the muzzle flash.

The processing unit may be adapted to eliminate a spatial background portion from the pixel signals.

The processing unit may be adapted to generate scene motion vectors.

The processing unit may be adapted to eliminate substantially slowly changing portions from the pixel signals. The processing unit may be configured to perform the elimination using at least one differencing of the pixel signals. The processing unit may be configured to perform the elimination using a second order differencing of the pixel signals.

The processing unit may be adapted to select pixel signals' portions substantially similar to a temporal signature of the muzzle flash.

The processing unit may have a part that is in-pixel.

The processing unit may include an analog processing unit adapted to process time dependence of the pixel signals. The analog processing unit may include a circuit adapted to perform at least one differencing of the pixel signals. The analog processing unit may include a circuit adapted to perform second order differencing of the pixel signals.

The analog processing unit may include a matched filter, adapted to match the temporal signature of muzzle flash.

The analog processing unit may be adapted to provide a voltage potential at outputs, the voltage potential being indicative of an estimate of likelihood of a detection of the muzzle flash.

The processing unit may include a parallel processing unit for processing time dependence of the pixel signals.

The analog processing unit may be adapted to generate substantially estimates of likelihood that a respective to the estimate pixel has detected the muzzle flash.

The parallel processing unit may be adapted to generate substantially estimates of likelihood that a respective to the estimate pixel has detected the muzzle flash.

The processing unit may include a digital processing unit processing time dependence of the pixel signals.

The digital processing unit may be adapted to generate substantially estimates of likelihood that a respective to the estimate pixel has detected the muzzle flash.

The processing unit may be adapted to select candidate pixels by comparing, for a plurality of pixels, substantial estimates of likelihood that a respective to the estimate pixel has detected the muzzle flash with a likelihood threshold being common for a plurality of pixels.

The threshold may be the same within each of two or more groups of adjacent pixels and different between these groups.

The processing unit may be adapted to select candidate pixels by comparing, for at least one pixel, an estimate of likelihood that the pixel has detected the muzzle flash with a likelihood threshold, obtained using a replica of the pixel signals.

The processing unit may be adapted to select substantially the same number of candidate pixels from subsequent PDA frames.

The device may include at least two processing stages, a later of the stages configured to apply a processing selecting candidate pixels to a smaller number of the PDA pixels than an earlier of the stages.

The device may include at least two processing stages, a later of the stages configured to select candidate pixels by utilizing more processing time per its candidate pixel than an earlier of the stages.

The processing unit may be adapted to selecting into candidate pixels those pixels whose signals together with their vicinity pixels' signals present substantially a spatial signature of the muzzle flash.

The processing unit may be adapted to suppress selection into candidate pixels of a pixel whose signal together with its vicinity pixels' signals present substantially a temporal-spatial signature of an unsuitably moving light source.

The processing unit may include at least two processing stages, a later stage of the stages adapted to confirm selection into candidate pixels of a candidate pixel whose likelihood estimate of having detected the muzzle flash has increased at the later stage of the processing.

The later stage of processing may utilize the candidate pixel's signal and candidate pixel's vicinity pixels' signals.

The processing unit may be adapted to suppress selection into candidate pixels of a pixel whose signal is not accompanied by a detection of an acoustic signal with an acoustic signature substantially similar to the acoustic signature of the muzzle flash-causing event.

The device may include a cooler for the PDA. The cooler may be of a kind enabling sensing at a temperature lower than a PDA ambient temperature.

The device may be configured without a cooler for the PDA.

The device may include a power supply allowing more than 1 hour of the detection.

According to a broad aspect of the invention there is provided a device for use in detection of a muzzle flash event, the device including a Photo Detector Array (PDA), sensitive in at least a portion of the NIR and SWIR spectrum, and a filter of electromagnetic radiation selectively passing in the portion a spectral range of low atmospheric transmission, the device including a power supply allowing from 1 to 24 hours of the detection.

The power supply may allow more than 6 hours of the detection.

The power supply may allow less than 12 hours of the detection.

The device may include a power supply of less than 10 Watts output power.

The device may be portable by a human during the detection.

The PDA may be a CMOS PDA. The PDA may be an intracavity PDA.

The device may include a compressing unit adapted to compress a replica of pixel signals of the PDA before the recording them into a memory.

According to a broad aspect of the invention there is provided a device for use in muzzle flash detection, the device including a Photo Detector Array (PDA), having a cutoff wavelength shorter than 3 microns, and a processing unit adapted to detect muzzle flash events in an output of the PDA.

The device may include a filter of electromagnetic radiation selectively passing in the PDA's sensitivity band a spectral range of low atmospheric transmission.

The filter may pass less than 50% of energy of wavelength being outside the spectral range of low atmospheric transmission and sensed by the PDA.

The filter may pass less than 25% of energy of wavelengths being outside the spectral range of low atmospheric transmission and sensed by the PDA.

The filter may pass less than 10% of energy of wavelengths being outside the spectral range of low atmospheric transmission and sensed by the PDA.

The filter may pass less than 2% of energy of wavelengths being outside the spectral range of low atmospheric transmission and sensed by the PDA.

The device may have at at least one wavelength of the spectral range a sensitivity being between 50% and 75% of the sensitivity of the PDA.

The device may have at at least one wavelength of the spectral range a sensitivity larger than 75% of the sensitivity of the PDA.

According to a broad aspect of the invention there is provided a processing unit for use in detection of a muzzle flash event, the processing unit being adapted to process pixel signals originating from a PDA and to generate substantially likelihoods of muzzle flash detection for pixels of the PDA, the processing unit including a multiplexer dividing the pixel 222 signals between at least two branches.

According to a broad aspect of the invention, there is provided a device for use in detection of a muzzle flash event, the device being substantially as described in the patent application with reference to the specification.

According to a broad aspect of the invention, there is provided a processing unit for use in detection of a muzzle flash event, the processing unit being substantially as described in the patent application with reference to the specification.

According to a broad aspect of the invention, there is provided a method being substantially as described in the patent application with reference to the specification.

BRIEF DESCRIPTION OF THE DRAWINGS

To further clarify the above and other advantages and features of the present invention, and to further show how it may be carried out in practice, an additional, at times more particular, description of the invention and invention features will be rendered in the below detailed description, at times with reference to the appended drawings. It is appreciated that these drawings, when depict only particular embodiments of the invention, are not to be considered limiting of its scope. Hence, the invention will continued to be described and explained with additional specificity and detail through the use of the accompanying drawings in which.

DETAILED DESCRIPTION OF THE PREFERRED EMBODIMENTS

The present invention provides a novel technique for use in detection of short events, for example of a gunshot event including a muzzle flash event.

Figure 1A:
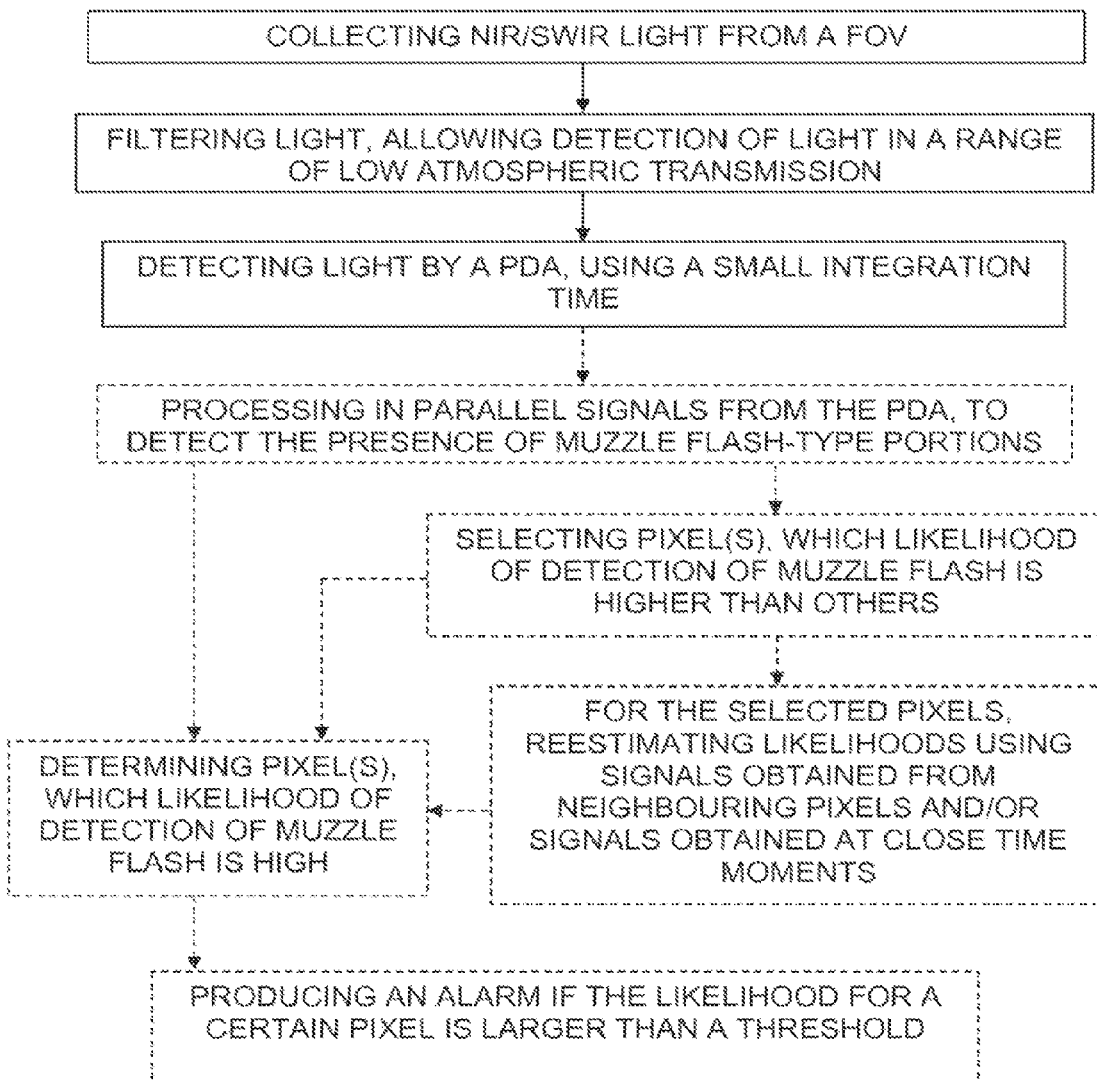
FIG. 1A is an example flow chart of the detection method, according to the to the inventors' technique.

FIG. 1A shows a flow chart of the main steps in an example of the detection method of the invention. As shown, near infrared (NIR) and/or short wave infrared (SWIR) electromagnetic radiation, possibly including radiation emitted by an occurred muzzle flash, is collected from a field of view (FOV). The radiation is spectrally filtered for detection of substantially a spectral range corresponding to relatively low light transmission in atmosphere. As it has been found by the inventors, the muzzle flash radiation components being in such spectral range can provide a relatively high useful signal and signal-to-noise ratio, though they carry only a portion of overall muzzle flash intensity and are relatively short-existing. Also, it should be understood that only a portion of the collected light can be due to the muzzle flash event, i.e. can be useful. The radiation of the chosen spectral range is detected with an appropriate photodetector array (PDA). The PDA integration time may be between $10^{-2}$ s and $5.0 \cdot 10^{-3}$ s, or between $5.0 \cdot 10^{-3}$ s and $2.0 \cdot 10^{-3}$ s, or between $2.0 \cdot 10^{-3}$ s and $5.0 \cdot 10^{-4}$ s, or between $5.0 \cdot 10^{-4}$ s and $10^{-4}$ s, or it might be less than $10^{-4}$ s. As a result, outputs of the PDA provide electrical signals, some of which are indicative of the muzzle flash, if it has occurred.

The example of the detection method optionally includes also other steps some of which are shown in FIG. 1A. In particular, a detection of those signals portions, which are due to the muzzle flash, may be carried out, with a certain detection probability and false alarm rate. In the present example, the detection includes a parallel processing, filtering signal portions varying as flash-type intensity (in the selected wavelength range) with time. This parallel processing may constitute a first layer of processing in the inventors' technique.

The inventors' technique may have a stage at which it determines an estimate of likelihood that an arbitrary pixel (e.g. each of the pixels) has detected a muzzle flash event. This estimate actually can be the output of the parallel processing.

The inventors' technique may determine a "suspicious" pixel (or pixels) for which the estimated likelihood of detection of a muzzle flash is higher than for others (this can be done by a pixel selection unit, such as CFAR). The method may also have a step at which it determines a pixel (or pixels) which likelihood is higher than a certain threshold. An alarm signal intended to inform an operator (or operating utility) or a user about the possible muzzle flash event may then be produced. The alarm signal may be a simple signal, e.g. a sound tone or a light flash, or it may be a composite signal carrying such data as for example pixel position, PDA orientation, determined likelihood, direction to the flash. The data can be presented in a form perceived by another device or by humans. The alarm signal may be recorded on a memory carrier.

The inventors' technique may include processing aimed at reestimation of the likelihoods for a portion of pixels. The likelihoods may be reestimated by a second layer processing using signals obtained from pixels being close to the suspicious pixels and/or signals obtained at times being relatively close to the moment for which the reestimation is done.

In particular, the second layer of processing may perform the following. For each of the suspicious pixels the second layer of processing may reestimate the likelihood that this pixel has detected a muzzle flash. To this end the second layer of processing may, for example, check whether the suspicious pixel belongs to a two-dimensional (2D) projection of trajectory of an object crossing the field of view and generating a strong light signal. In such case the likelihood corresponding to this pixel may be decreased, because the signal could be produced by a strong sunlight reflector or artificial light source, e.g. by a bird crossing the field of view or a car light or a sun glint. A tracking test aimed at discriminating pixels grouping in trajectories may be based for example on the Hough Transform. For another example of the operation of the second level processing, the likelihood corresponding to a suspicious pixel may be increased if this pixel has neighboring pixels which signals or likelihoods are indicative of an existence of a pixel group having a muzzle flash characteristic shape. For example, this characteristic shape can be similar to the infinity sign. For yet another example of the operations performable by the second level processing, the likelihood corresponding to a suspicious pixel may be adjusted according to the spatial and temporal characteristic of the pixels signals. Such adjustment may account for the possibility of fire bursts. If the second layer of processing receives two or more suspicious flashes separated by a certain characteristic time period and possibly by few pixels, it can increase the likelihoods of these events being muzzled flashes, because they could be produced by e.g. a machine gun. On the contrary, detection of aperiodic suspicious events separated by small time periods may be indicative of the absence of muzzle flashes, because there would be no enough time for weapon recharge. The above-described processing is facilitated if signals produced by the PDA and/or first layer of processing are stored in a memory for a time period in which they may be useful for the second and other layers of processing. The data from the PDA and/or first layer when they are prepared for further use can be sampled or transformed, e.g. partially averaged, into less broadband data. The data also can be compressed (without loss of information) and stored in the memory in the compressed form.

The first layer of processing thus may work with the second layer of processing in a Constant False Alarm Rate regime (CFAR regime): a constant stream of suspicious (candidate) events from the first layer may be selected and processed by the second layer. The second layer is designed to handle a predetermined constant flow of suspicious events (e.g. 10 or 20 per frame). Due to the significant data reduction performed by the first layer (e.g. from ~100,000 pixels per frame to ~10 suspicious pixels per frame), the second layer has significantly more time per pixel to analyze the suspicious events. A suspicious event is confirmed and an actual alarm is produced if the reestimated likelihood of that the corresponding suspicious pixel has detected a muzzle flash event is larger than a certain threshold.

Figure 1B:
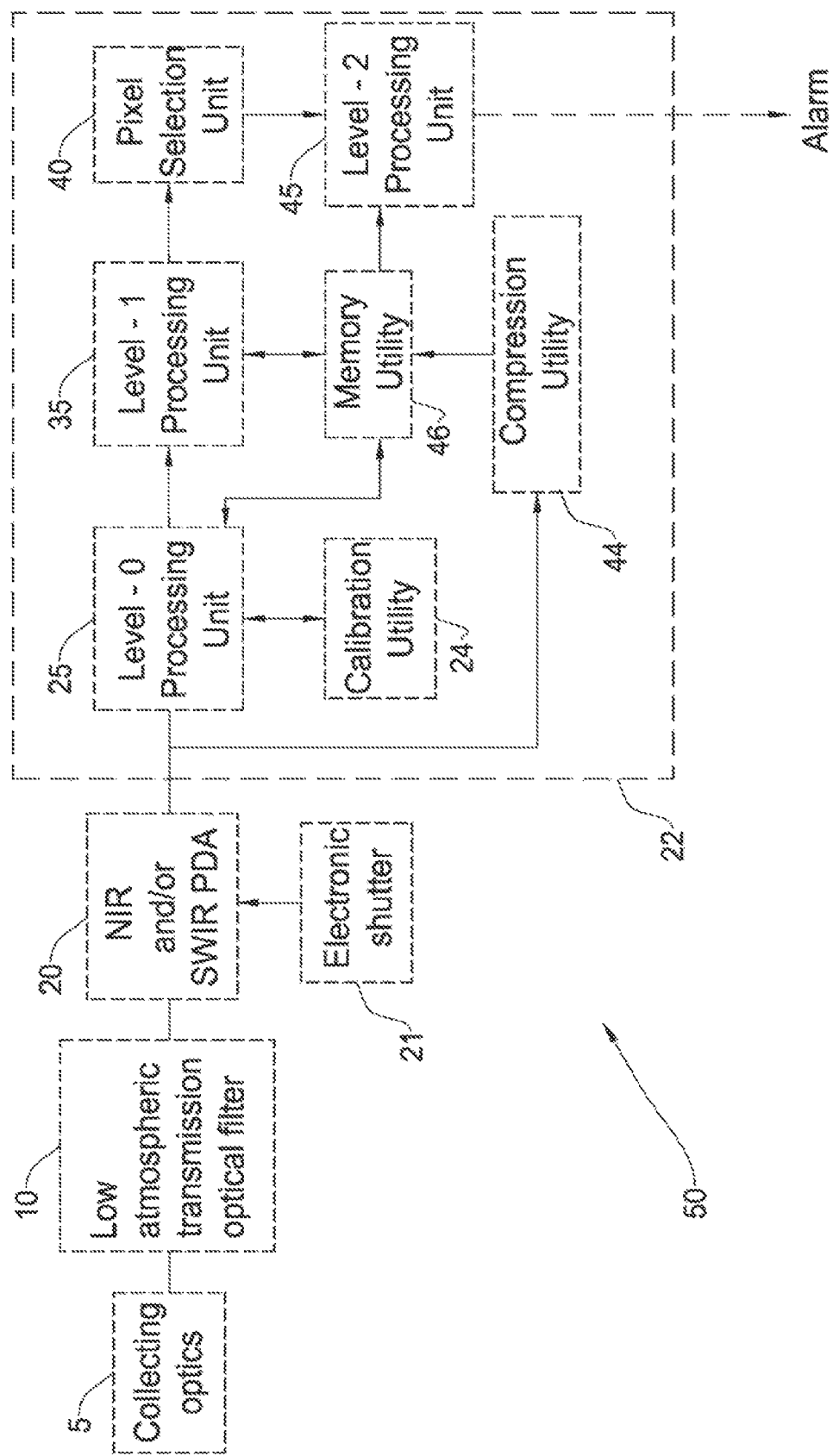
FIG. 1B is an example of a possible organization of a detection system according to the inventors' technique.

FIG. 1B schematically illustrates an example of a system 50 configured in accordance with the technique of the inventors. System 50 includes one or more of the following: collecting optics 5; an optical filter 10; a photodetector pixel array 20; a shutter 21, a processing system 22. Collecting optics 5 may be configured to define a certain chosen FOV in a certain chosen wavelength (sub)region (e.g. in a broader NIR/SWIR region). Optical filter 10 may be configured to pass light corresponding to bands of low atmospheric transmission, particularly in the chosen NIR/SWIR wavelength region. PDA 20 is sensitive in the corresponding NIR/SWIR bands. Shutter 21 may be an electronic shutter defining the small PDA integration time, as specified above. Additionally or alternatively, shutter 21 may be configured to define a small dead time. Shutter 21 may be a rolling shutter. Subsystem 22 performs the processing of electric signals (i.e. of a video stream) produced by PDA 20 operated by shutter 21.

In the present example, subsystem 22 includes a level-0 processing unit 25, a calibration utility 24, a level-1 processing unit 35 performing parallel processing, a pixel selection unit 40, a level-2 processing unit 45, a compression utility 44, and a memory utility 46.

Level-0 processing unit 25 may apply a non-uniformity correction (i.e. correction for the non-linearity of PDA response) to the raw signal from the pixels. Calibration utility 24 may store a bad pixels map for photodetector 20 (the bad pixels can be found during calibration of the photodetector). During operation of the inventors' gunshot detection system, calibration utility 24 can eliminate the bad pixels from the data which are input to level-1 processing unit 35. Level-0 may be configured to find motion vectors.

Level-1 processing unit 35 performs, as described above and, more specifically, below, while referring to the examples of FIGS. 2A-2B and 3A-3D, the data reducing processing aimed at detection of muzzle flash, particularly through selection of muzzle-flash time-dependency in the received signals. The level-1 may use relatively simple algorithms (such as second order derivative) to identify signals which resemble a muzzle flash time signature. In the parallel implementations, the layer-1 analyzes the time dependent signal from each pixel independently of other pixels, in order to reduce computing power. The level-1 processing typically allows achieving effective data reduction of 3-6 orders of magnitude for level-2 processing or for alarm rate (the data reduction for level-1 can be defined as a number of pixels divided by a number of suspicious pixels in a frame). The level-1 and level-2 may utilize for connection a pixel selecting utility 40, such as the CFAR utility, so that a number of suspicious events does not overflow layer-2 processing capacity. For each of the suspicious pixels the layer-2 processing may need to obtain the values of its neighboring pixels, several frames before and after the suspicious event occurred. To this end outputs of the PDA or any level (level-0, level-1 and/or level-2) processing unit may be stored in memory utility 46.

The pixel-selecting utility 40 can prepare a list of candidate pixels for the layer-2. To this end, this utility can compare the likelihoods calculated by the layer-1 or it can generate the likelihoods based on the output of the layer-1. It also may be configured to connect with level-0 and/or memory (these connections are not shown in FIG. 1B), because it may use historical or spatial data to calculate temporal and spatial statistics for pixels, for example statistics on luminance level in the vicinity of the pixel of the candidate event and/or before and/or after the occurrence of the candidate event in order to evaluate the spatial statistical significance of the event. Indeed, the utility may benefit from taking into account information gathered after the candidate event had occurred, if it is configured to use for reestimation data obtained after a candidate event, in addition to or instead of the historical data. To this end, a delay of several tens to hundreds of frames between data processed in the second stage and in the first stage may be utilized.

Level-2 processing unit 45 implements the above-mentioned second layer of processing aimed at determining suspicious pixel(s) and reestimating the likelihood(s) that the system has detected a muzzle flash. For this purpose, the second layer of processing may use signals obtained from neighboring (close) pixels and/or signals obtained at close time moments. Hence, level-2 processing unit combines signals received from level-1 processing unit 35 through pixel selection unit 40 and/or uses signals stored in level-1 memory utility 46. It also may store data that it produces (e.g. likelihood estimates) in memory utility 46 and may access the data earlier recorded in this memory. The processing implemented by level-1 and level-2 processing unit may be in accordance with the bad pixel map.

In particular, level-2 unit may be configured to reestimate the muzzle flash likelihood in view of a possibility of the splitting of the muzzle flash projection to several close or adjacent pixels (e.g. 2 or 4 pixels), which together represent the same event. In this connection, it should be noted, that a muzzle flash projection may not lose its specific shape, such as heart shape, balloon shape, droplet shape round shape. At short distances, the details of the shape may be imaged, analyzed by the level-2 unit, and used for confirmation or rejection of muzzle flash event and for localization of the respective muzzle flash.

Level-2 unit may also be configured to reestimate the muzzle flash likelihood in view of a possibility of various timings of the muzzle flash relatively to the samplings, in order to take into account the variability of the sampled muzzle flash waveform. Indeed, a muzzle flash does not have to occur within a single integration interval, it can begin in one frame and end in a different frame.

Turning back to the level-0 processing, it may also be configured to analyze the motion in the pictures, and generate frame to frame motion vectors for blocks of m times n pixels, so that clutter and background can be accurately deducted at the further layer(s). The frame to frame motion vectors may be generated by using a block matching algorithm proved useful for motion compensation. As in MPEG applications, the generation of motion vectors may be implemented in software or in hardware, in FPGA or ASIC. In some of the preferred adaptations (embodiments), the generation of motion vectors is performed by a programmed FPGA. In another option the generation of motion vectors is performed at layer 2 and only for suspicious (i.e. candidate) events.

Figure 2A:
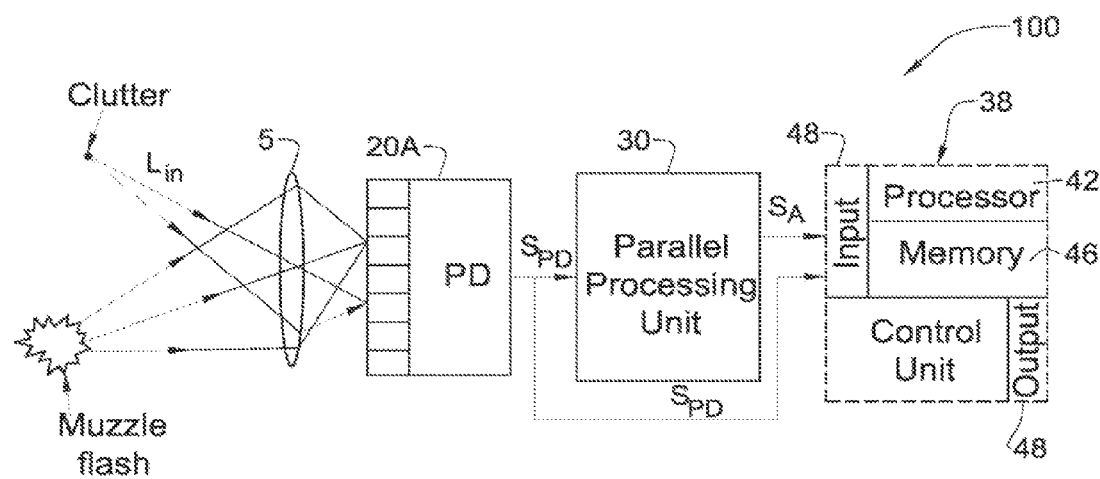
FIGS. 2A and 2B schematically illustrate two examples of a detection system, according to the inventors' technique.
Figure 2B:
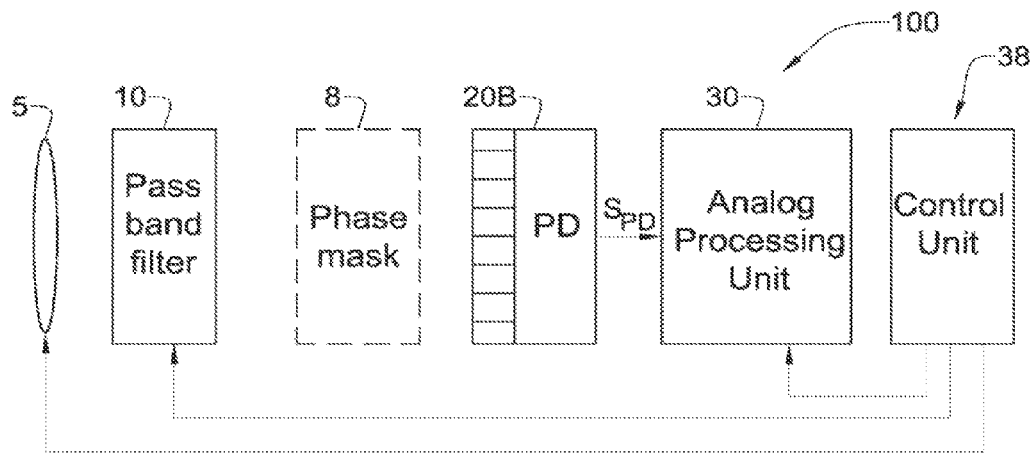

Referring to FIGS. 2A and 2B, there are schematically illustrated two examples, respectively, of a gunshot and muzzle flash detection system of the present invention. The detection system is configured to receive radiation from a certain field of view and detect whether the received radiation contains a portion emitted by a muzzle flash.

In the example of FIG. 2A, a detection system 100 includes a light collecting and focusing optics 5 (e.g. a lens assembly formed by one or more lenses) in front of a photodetector pixel array unit 20A, a parallel processing unit 30, and a control unit 38.

Lens assembly 5 collects light Lin from a region of interest and may have a wide field of view of tens of degrees in each lateral direction. It focuses light Lin onto photodetector array 20A. The region of interest can include a range of distances up to several hundred meters, e.g. a range up to 500 m from the lens assembly. The light focusing is applied to a predetermined wavelength range. It should be understood that the lens assembly may be operable by the control unit or manually by a user to focus light from a different field of view and/or to focus light of a different wavelength range. Though in the present example the lens assembly is a constructional part of the detection system, generally this is not a requirement.

Figure 2C:
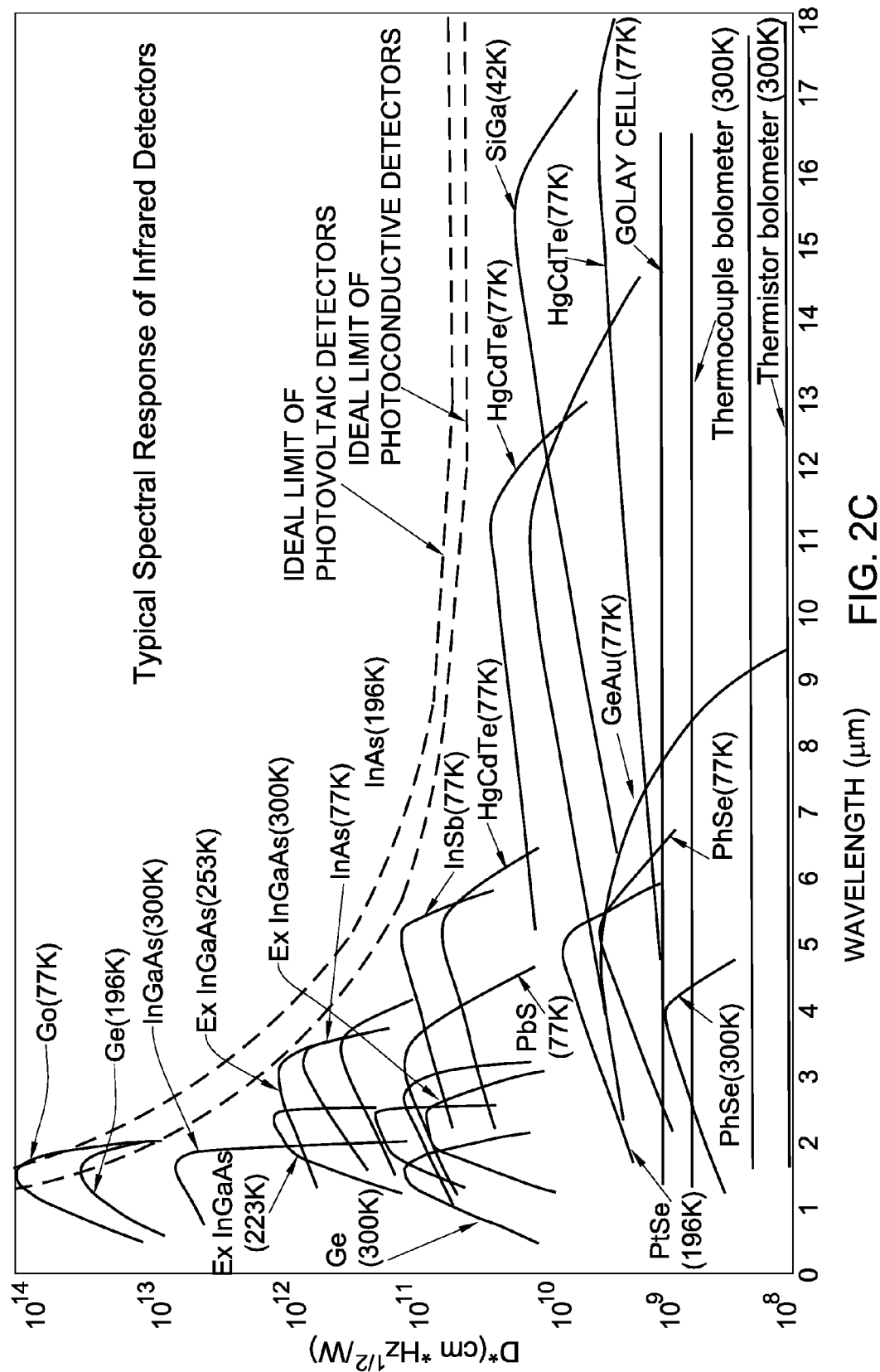
FIG. 2C shows the sensitivity curves of various exemplary materials used in photodetectors.

Photodetector array 20A can be of any known type sensitive to a subrange of ultraviolet/visible/infrared spectra. Photodetector array 20A may be based, for example, on PbS, InAs, GaAs, InGaAs, MCT, PbSe, or InSb for relatively fast and low cost NIR, SWIR or MWIR detection. In some preferred embodiments the PDA is light, fast, sensitive, inexpensive, and does not require cooling and much power for operation. Also, in some preferred embodiments the photodetector array has a large pixel count detection array and allows accurate determination of a muzzle flash event location. The sensitivity of various materials used in photodetectors is shown on FIG. 2C, as a dependent of wavelength. The technique of the inventors may utilize for example InSb (Indium Antimonides) and MCT (HgCdTe) at 77K for MWIR imaging, and InGaAs (300K) and Ex InGaAs (253K) for SWIR imaging.

The inventors have found that the NIR/SWIR detection of muzzle flash can he utilized in the in-field muzzle flash detection applications. This is because in addition to energy in the MWIR/LWIR, the hot gasses of the muzzle-flash emit blackbody radiation energy in the NIR/SWIR range.

Nevertheless, the inventors have chosen to use photodetectors sensitive to NIR and/or SWIR light for the purposes of muzzle flash detection in some embodiments of their technique. This is because the inventors have considered that photodetectors having the desired characteristics for their application are more easily available in NIR/SWIR than in MWIR/LWIR and possible losses in optical signal may be overcompensated by gains from a higher sampling rate (smaller integration and dead time) and frame rate of NIR/SWIR detectors; from the use of the solar blind filters which reduce clutter and enhance signal to clutter ratio; from the increased availability of higher resolution in the NIR/SWIR detectors due to the higher maturity and lower cost of PDA materials in this range; and from the relaxed need or lack of need for cooling the PDA for achieving high performance. (Already the relaxed need is beneficial, because cryogenic coolers become smaller, lighter, less power-consuming, and costly with the decrease of the PDA size and heat dissipation). For example, a combination of NIR/SWIR optics and photodetector is typically smaller than a similar combination of MWIR/LWIR optics and photodetectors, because diffraction effect is smaller in NIR/SWIR, a larger variety of optical materials and manufacturing techniques is available, and NIR/SWIR detectors are faster and do not require cryogenic cooling to provide fast and sensitive detection. The technique of the inventors typically involves photodetectors having a quantum efficiency of more than 20% in NIR/SWIR range used for detection.

In connection with the above, it should be noted, that many features of the invention are not restricted to the NIR/SWIR range. In particular, the inventors have considered that detection systems utilizing other wavelength ranges can also utilize the layered architecture, the filtering of light of the low transmission in atmosphere, the suppression of candidate events produced by an inappropriate group of pixels, the shutting scheme providing the small dead time, the light collecting scheme providing relatively large field of view per pixel.

Parallel processing unit 30, capable for example of implementing level-1 processing unit 35 of FIG. 1B, is configured and operable according to the invention for filtering the electrical output of the pixel array for detecting or selecting a muzzle flash-type signal portion (e.g. for suppressing all signal portions except for possibly present flash-type signal). The processing unit may include an array of analog processors. These processors may be configured for simultaneous operation. In some other embodiments processing unit 30 is configured to perform analog-to-digital conversion and process the digital data. The operation in the digital configuration may be partially sequential. The analog-to-digital conversion may be done before the level-1 processing unit, for example already at the PDA output.

Detector device 100 is associated with a control unit 38, which may or may not be a constructional part of the system. The control unit is connected to the output of the first level, for example parallel, processing (sub)unit (via wires or wirelessly) and may perform the second layer of processing. The level-2 processing unit 45 and memory utility 46 of FIG. 1B may be implemented in control unit 38.

Control unit 38 is typically a computer system including inter alia a digital signal processor 42, a memory 46, and input/output utilities, generally at 48. The control unit is configured for receiving and further processing data from analog to digital, parallel, processing unit 30; and possibly also for controlling at least some of the elements of the detector device. For example it may perform the second layer of processing and/or control the lens assembly, filter(s), PDA settings (i.e. settings of the level-0 processing e.g. those input into level-0 processing unit from level-0 processing utility), parallel processing unit settings (threshold for pixel selection). It also may be configured for receiving and/or providing signals to an operator. Input utility 48 of control unit 38 may be configured to pass a limited number of candidate pixels to the second layer of processing, for example it may be configured to work in the CFAR regime.

In the example of FIG. 2B, showing another preferred embodiment of the muzzle flash detection system of inventors, detection system 100 includes a photodetector unit 20B associated with a light collecting and focusing optics 5, an optical filter 10 accommodated in the optical path of light propagating towards the pixel array 20, and an analog (in this case analog parallel) processing unit 30 at the output of the pixel array. Filter 10 is configured and operable to enable detection of relatively short-living muzzle flash components, as will be more specifically described further below with reference to FIGS. 5A-5C. Filter 10 may be a stand alone unit or may be integrated within an intracavity detector. Photodetector unit 20B with filter 10 is sensitive to substantially a spectral range corresponding to relatively low light transmission in atmosphere. To this end, the sensitivity of such arrangement to at least one wavelength of the utilized low atmospheric transmission spectral range may be between 10% and 30%, or between 30% and 50%, or between 50% and 75%, or larger than 75%. An average sensitivity of such arrangement to wavelengths outside such range and present in daylight and to which the photodetector (i.e. the imager) is fundamentally sensitive, may be smaller than 10% (or 5%, or 1%).

Also device 100 may include a phase mask 8. The phase mask may perform signal processing in the optical domain, for example, subtraction of signals of two different wavelengths.

Figure 3A:
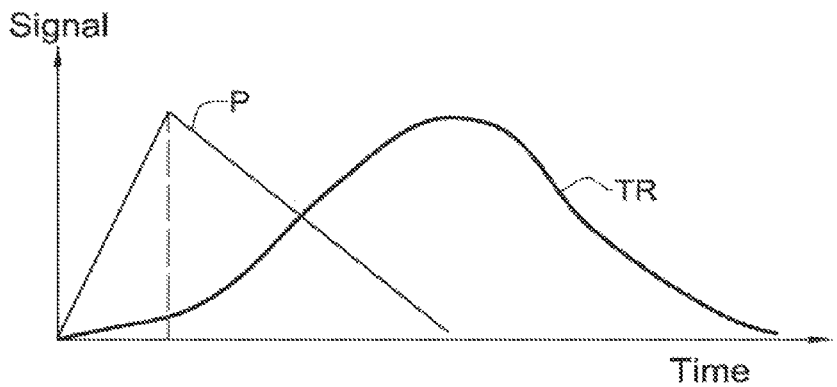
FIGS. 3A-3D exemplify some possible configurations of the processing system, according to the inventors' technique, capable of use in the detection system, according to the inventors' technique.
Figure 3B:
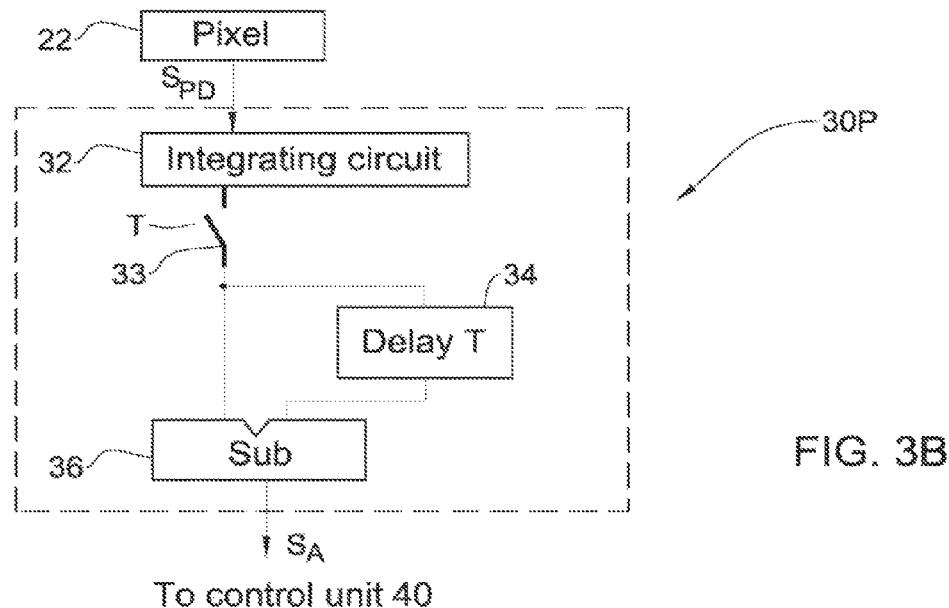
Figure 3C:
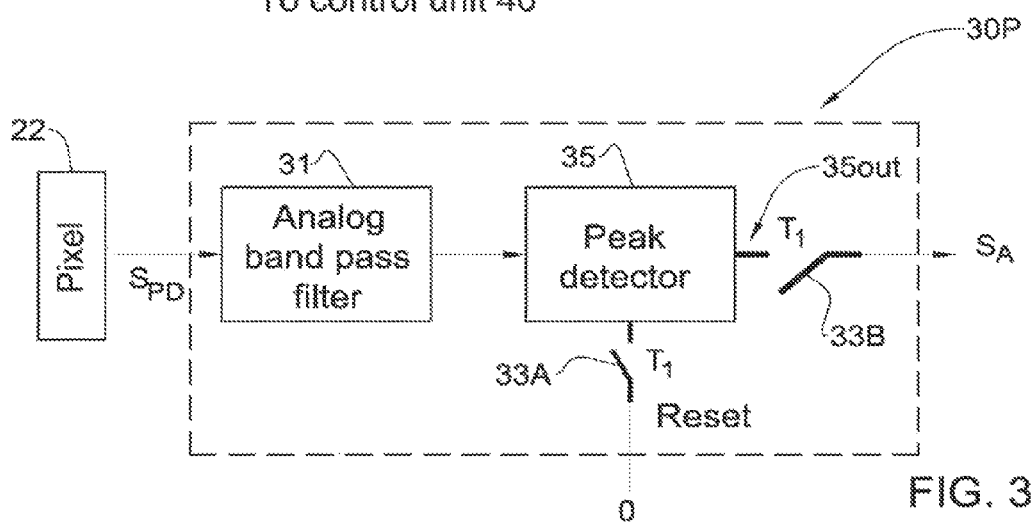
Figure 3D:
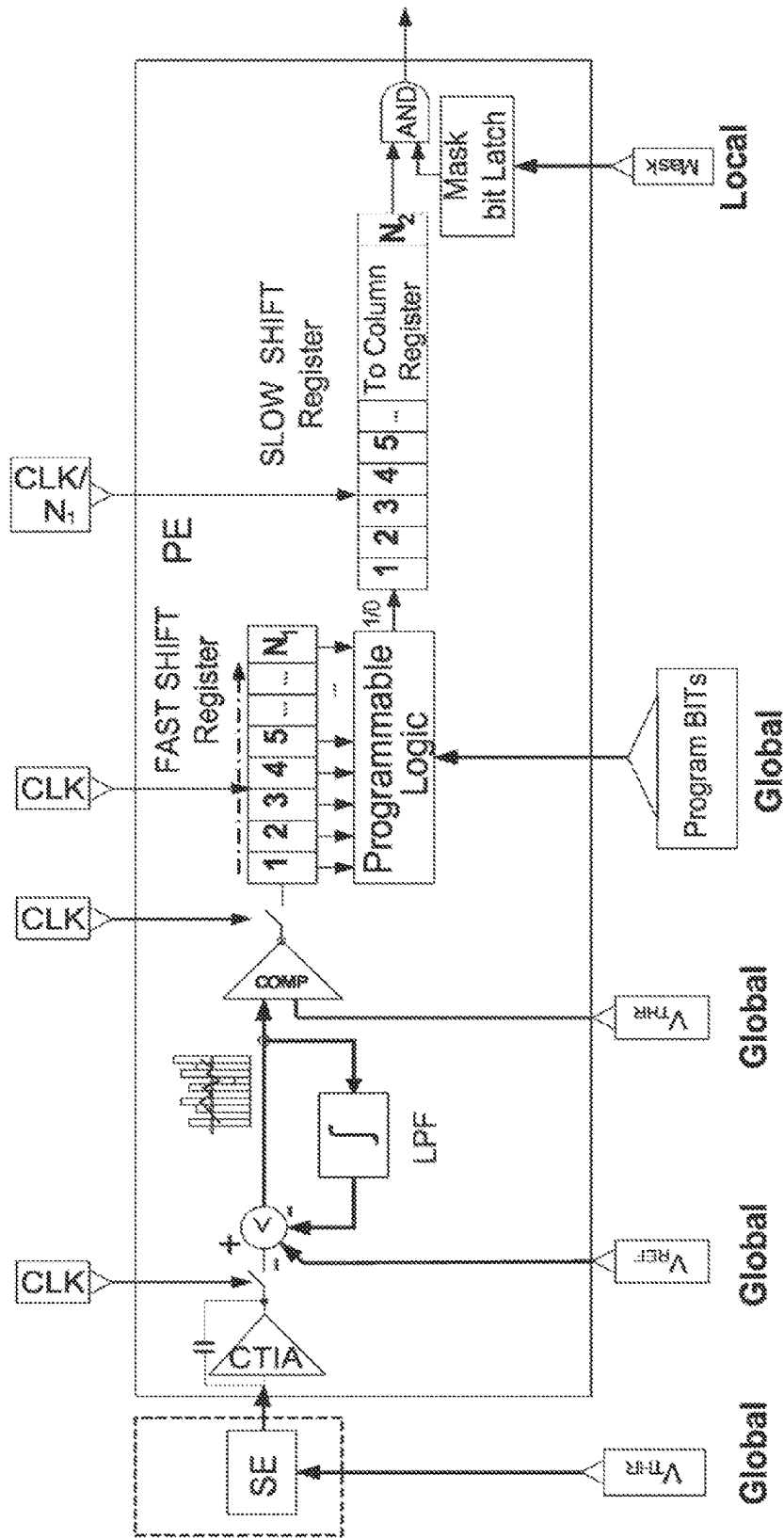

Further in FIGS. 3A-3D there are exemplified some possible configurations of the processing (sub)system carrying out the layer-1 in-pixel processing and, in case of FIG. 3D, also the layer-2 processing. It should be understood that the layer-1 processing unit may be formed by an array of operating in parallel individual processors, each of which is associated with the detector pixel, and that the design of the parallel processing unit is aimed at filtering muzzle flash time domain features in the received signal, for example at amplifying the possibly present signal portion having a time-dependence of a type producible by a muzzle flash while removing other signal portions. The features to be suppressed or removed from the photodetector signal are those caused by noises and clutter. Hence, a pulse to be filtered by the level-1 processing utility is that which has a well defined peak, a muzzle flash type duration (for most firearms this duration is up to about a few milliseconds) and an asymmetric form typical to the muzzle flash. Other signal portions in the photodetector detector pixel output are considered as associated with clutter or noise.

The processing unit (e.g. 35 in FIG. 1B or 30 in FIGS. 2A-2B), in particular the parallel processing unit, may be an array of matched filters. In this connection, FIG. 2A shows a pulse P created at the photodetector output in response to a muzzle flash and a time response characteristics TR of the matched filter processing unit. Pulse P presents only the portion of a photodetector output (SPD in FIGS. 2A-2B); however other portions of the photodetector output are filtered out by the match filter. one of the uniquenesses of pulse P lies in its asymmetric variation with time. Pulse P grows from zero to a maximum in a first predetermined time interval, and falls back to zero in a second, typically longer, predetermined time interval. The second time interval may be about two times longer than the first time interval. The matched filter is adapted to detect the uniqueness of the muzzle flash signal. Various matched filter physical implementations, either analog or digital, are known per se and therefore need not be described in detail. It should be noted, however, that in some preferred embodiments the muzzle flash features are filtered by in-pixel analog processing, such as parallel in-pixel analog processing, or by separate digital processing following an analog-to-digital converter (ADC). The in-pixel processing can achieve very high speed, while keeping the bandwidth of the output signal low (after the use of pixel-selecting unit). This allows the next level of processing to operate on a reduced input rate of suspicious events. It also allows using the specific time-dependency or shape of signal for better distinguishing between true events and other short but different events. In some embodiments, the processing speed of the first level of processing is selected to match the PDA sampling speed, which is selected to produce at least several samples within the time of the muzzle flash.

FIGS. 3B and 3C show specific but not limiting examples of an analog in-pixel processing unit 30P adapted to filter in the output of a photodetector pixel a muzzle flash type signal portion. This portion has light intensity behaving as an asymmetric pulse of a muzzle flash duration i.e. it has a characteristic muzzle flash time variation.

In the example of FIG. 3B, analog processing unit 30P processes a signal SPD from a pixel 22 of the photodetector array. Unit 30P includes an integrating circuit 32, a delay utility 34, a subtraction circuit 36, and a switch 33. Signal SPD is integrated by a circuit 32. Switch 33 is clocked with a predetermined time T (i.e. is shifted for a short time into its ON state with increments of time T). Time T is substantially equal to a delay time of delay utility 34 and is smaller than a pre-estimated time-width (duration) of a muzzle flash pulse at the photodetector output (e.g. pulse P shown in FIG. 3A). Since the integrated signal is output to one input of subtraction circuit 36 and also, through delay utility 34, to the other input of subtraction circuit 36, the time change of the pixel output is determined. The result of subtraction forms an analog signal SA, which then may be directed to the memory utility and/or the pixel selection utility (and then to the level-2 processing unit) and/or to the control unit.

In the example of FIG. 3C, analog processing unit 30P includes a band pass filter 31, a peak detector 35, and two switches 33A and 33B. A signal SPD from a pixel 22 of the photodetector array is passed through band filter 31 to peak detector 35. The band of filter 31 is selected so as to allow passage of frequencies corresponding to Fourier transform of a pre-estimated muzzle flash pulse at the photodetector output (e.g. pulse P shown in FIG. 2A). Peak detector 35 outputs a peak value of this pulse at its output node 35out. Switch 33A is a reset switch for resetting a peak detector output 35out to zero once during a certain time interval T1. Switch 33B is an output switch for outputting the peaks to a control unit 38 (which is not shown in this figure). This output is done right before the reset of the peak detector. A sequence of the peak values forms an analog signal SA. So designed analog processing unit 30P can select a signal portion corresponding to a pulse of the flash-type intensity variation with time in signal SPD. Peak detector 35 enables the detection of the muzzle flash peaks in case of reset time T1 being shorter or longer than the time-width of a muzzle flash pulse. However, in some preferred configurations, the reset time T1 is selected to be shorter than the pre-estimated time-width of muzzle flash pulse, because such a selection allow for comparing a time-width of a received pulse with the pre-estimated time-width of the muzzle flash and also because such a selection allows for resolving signals from consecutive muzzle flashes.

Moreover, when time T1 is selected so as to be several times (e.g. 10) shorter than the time-width of a muzzle flash pulse, the analog processing unit can detect an asymmetry of a signal portion corresponding to a pulse of the flash-type intensity variation with time.

It should be understood that the technique of the inventors is not limited to the above examples of the analog processing unit. Other configurations of analog processing unit 30P may include various circuits, including such known per se circuits as a differencing circuit, a sample-and-hold circuit, a comparator, a low pass filter, a high pass filter, an envelope detector. In some preferred embodiments, the analog sampling is carried out with a sampling rate less than a tenth of the duration of the selected signal.

Thus, the analog processing unit may be configured to have a time response allowing identification of the above-described asymmetric pulse P. The analog processing may be useful for facilitating a further digital processing (sampling, layer-2 digital processing) if it follows.

Another example of the processing system of the invention is shown in FIG. 3D. This in pixel signal processing subsystem has a first stage, in which signals obtained from different pixels are not combined, and a second stage in which these signals are combined. In the first stage a sensing element SE (i.e. a pixel) sends a detected signal to a charge integrating transimpedance amplifier (CTIA) circuit integrating the signal. Signal then propagates to a variable signal detection, which deducts a Low Pass Filter (LPF) averaged signal from the current signal. The result is then input to a fast shift register, where the signal is processed by a programmable logic, e.g. by a programmable logic implementing the matched filter. The output of the register determines a likelihood that an event has occurred within a given time frame. The first parallel stage of processing finishes here. The signal then is input into a slow shift register. The values in the slow shift registers are co-processed with values in slow shift registers of adjacent pixels. This co-processing is performed using a mask bit latch or other logic, filtering the signals for portion having a spatial signature of the event to be detected typically for the event taking place in the middle of the mask. The mask scans the entire image area in order to check for an event in each of the pixels. This architecture may be used for other algorithms, such as video motion detection, video tracking, Automatic Target Recognition.

In another example, the system of the invention can be organized as follows. The system uses a typical PDA and digital processing. The PDA sends signals to a processing board, where they are sampled and transformed into digital signal, containing the signal level detected at each of the pixel. This digital signal may be parallel. The digital signal is input into the layer-1 processing unit. For example, the interface between the PDA with the processing board can be a digital communication link such as the "Camera Link" standard. A possible bit-stream of the digital signal can be estimated: for a 200,000 pixel detector working at 500 frame/sec rate and using 12 bit encoding of the analog signal, the bit stream needs to be as high as 1 Gbps. The system therefore uses the layered processing scheme, which can allow sampling at the selected frame rate (e.g. 500 frames/sec). The processing at low rates may be configured without a matched filter; it may be rather configured to find at the second layer short events that appear in 1-2 frames and then vanish, where the suspicious events reaching the second layer are those which prevail over a threshold, established by the second layer's pixel selection utility (e.g. CFAR utility), applied to the digital first layer. Such digital layered processing may be performed in an ASIC or a field programmable gate array (FPGA), for example of the Xilinx Vertex family. Layer-1 can be hard coded into the FPGA, while the layer 2 algorithm (all or part) can be exercised in software, either based on a processor core implemented in the FPGA, or on a separate processor, such as control unit's processor. The algorithm can be partially simultaneous and partially sequential—i.e. not all, but several, pixels are processed simultaneously.

Figure 4A:
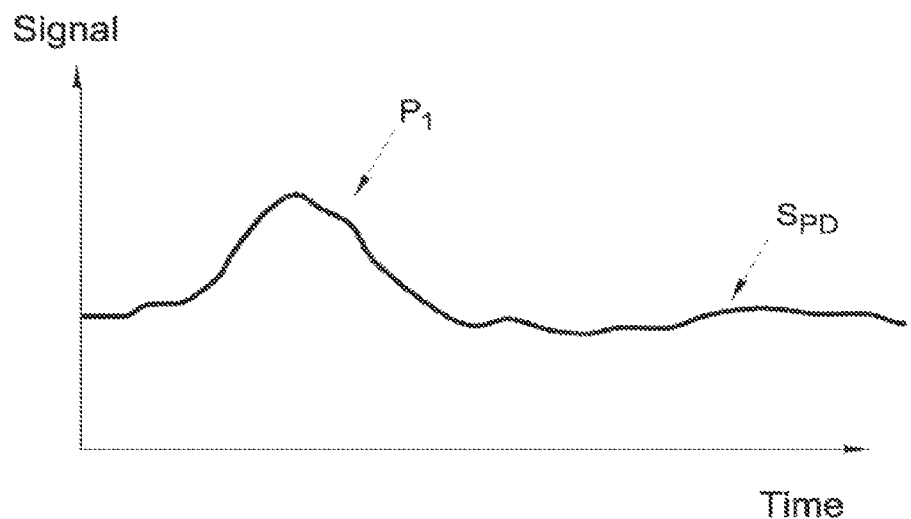
FIGS. 4A and 4B exemplify the operation of the analog processing unit, according to the inventors' technique.
Figure 4B:
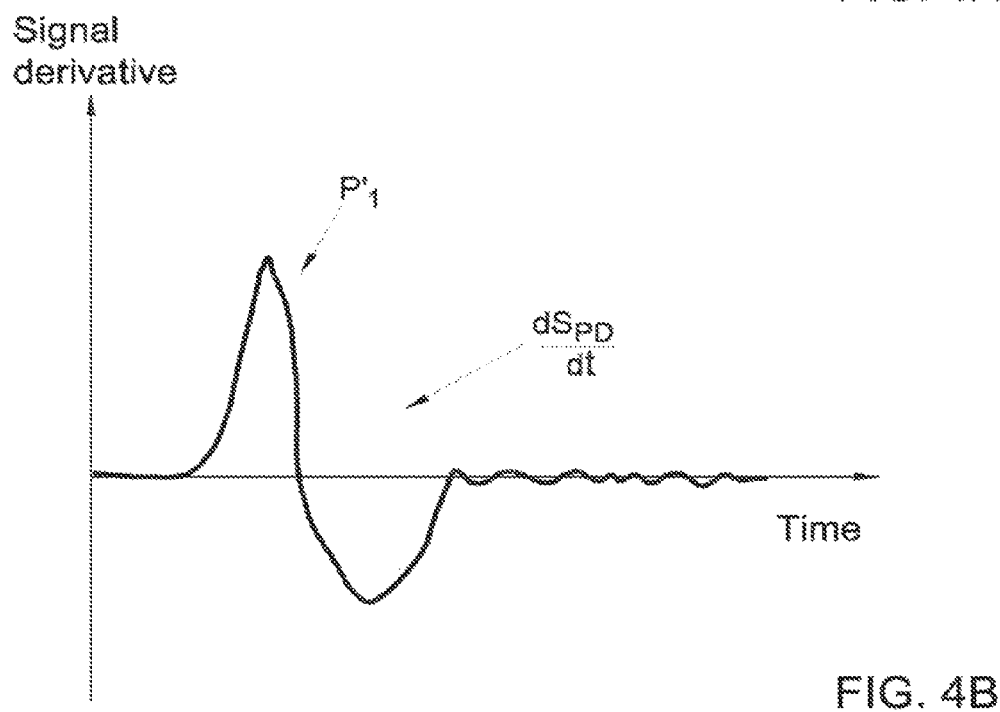

Referring to FIGS. 4A and 4B, the operation performed by the analog or digital parallel processing unit are more specifically described. FIG. 4A exemplified a photodetector signal SPD to be processed by the analog processing unit. Signal SPD is composed of clutter and various noise portions, and has a muzzle flash peak P1.

FIG. 4B exemplifies a signal SPD', a derivative of signal SPD of FIG. 4A. The derivation can be performed by means of a differencing circuit or subtracting circuit (36 in FIG. 3B). Additionally, before the derivation, a low pass filter can be utilized to remove from signal SPD the features corresponding to very short events, i.e. events much shorter than the time width of pulse at the photodetector output. Thus received signal SPD' has a portion P1' corresponding to the muzzle flash and carries reduced noise and clutter.

Signal P1' can be output directly from the parallel processing unit or through an absolute value peak detector (not shown), clocked with time that in some preferred embodiments is shorter than the time between positive and negative extremes of signal P1'. If the absolute peak value detector is used, then the extremes of signal P1' are not lost from a sample of output signal used by a digital processor 42 of control unit 40.

Considering the above mentioned uniqueness of the muzzle flash pulse (P in FIG. 3A), this results in a uniqueness of pulse P1': the magnitude of the positive peak of pulse P1' is approximately two times larger than the magnitude of the negative peak, but the duration of the positive part of pulse is two times shorter than of the negative part. Thus, if pulse P1' is sampled three times by the peak detector, the following sequence of values will be generated: 0, +x, −x/2, −x/y, 0 (this sequence presents a not limiting example). Here, x is a magnitude of the positive peak of pulse P1', it depends on the shooter-detector distance; y is some number greater than 2.

In addition to the processing unit reducing some noise and clutter, the system of the invention may use other means to perform muzzle flash detection with high probability and low false alarm rate. For example, a filter, processing received light before its detection by the pixel array (e.g. filter 10 in FIG. 2B), can be used to increase the SNR/signal to clutter ratio.

Figure 5A:
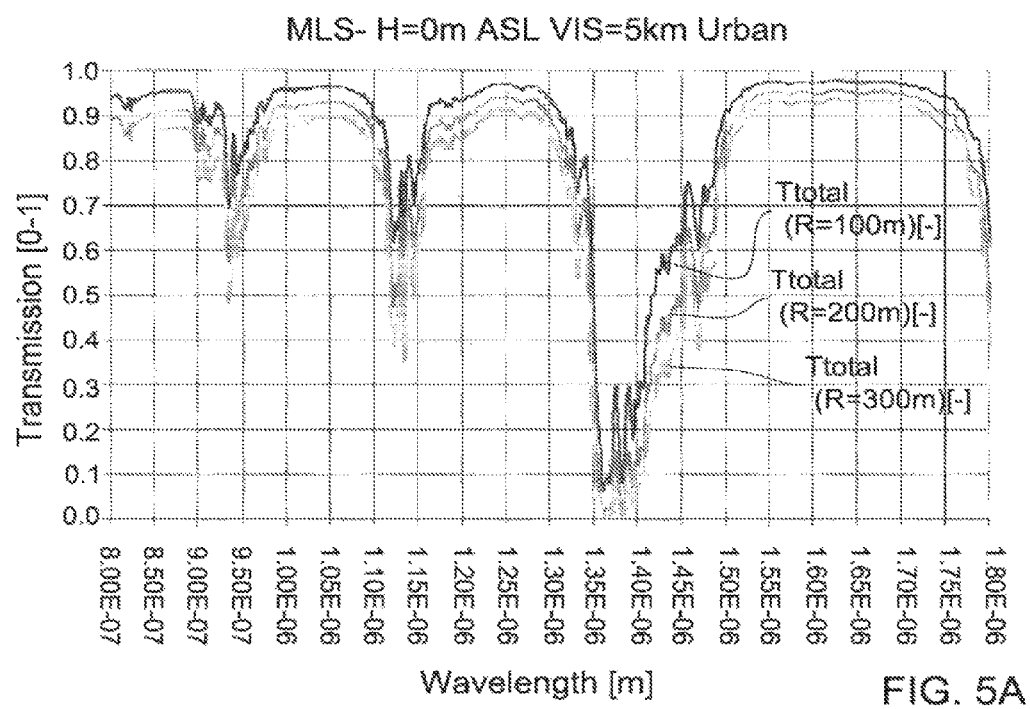
FIGS. 5A-5C illustrate the principles underlying the use of an optical filter in the technique of the inventors.
Figure 5B:
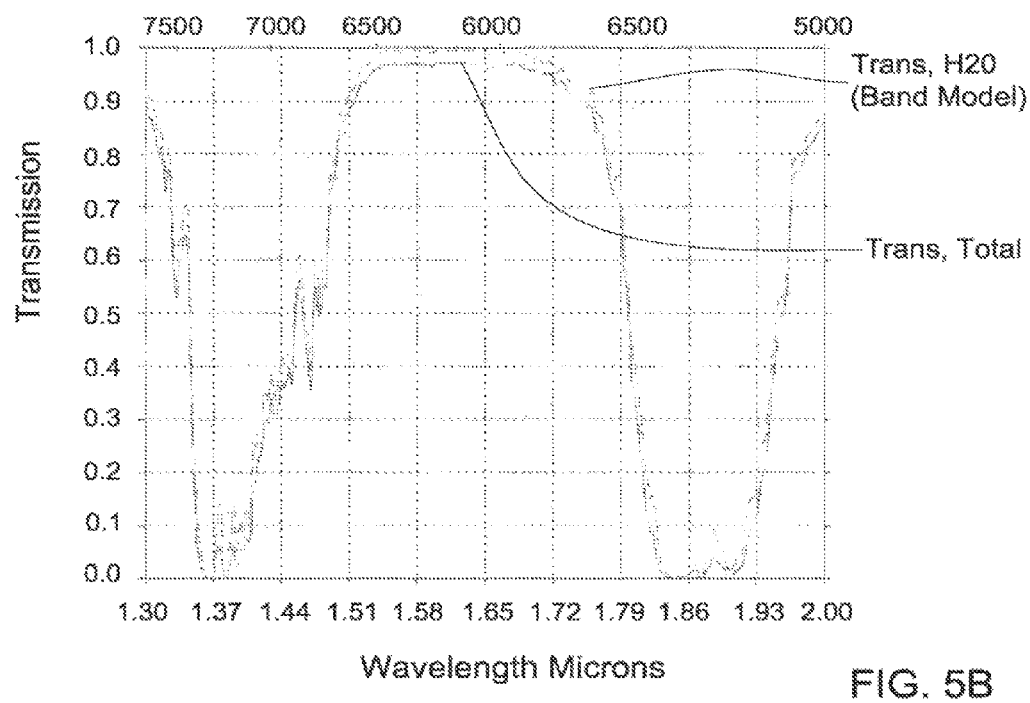
Figure 5C:
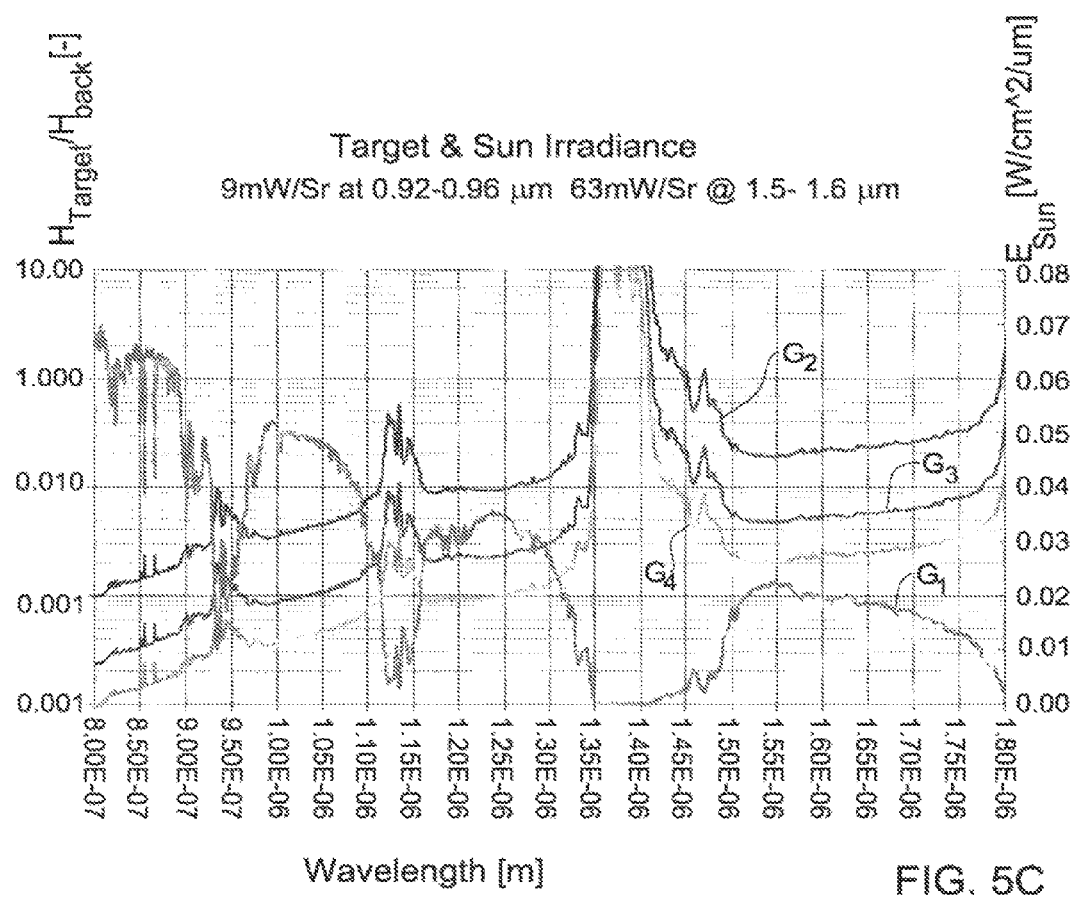

Reference is made to FIGS. 5A-5C exemplifying the principles underlying the filter selection. FIGS. 5A and 5B show a wavelength dependence of the atmospheric transmission in the NIR and SWIR in short ranges of 100, 200, and 300 m. It is seen that the transmission is very low for example in a range around a wavelength of 1.4 µm. According to the invention, the ranges of the low atmospheric transmission may be used to facilitate the muzzle flash detection. Here are some of these ranges: 1.34 to 1.50 microns, 1.80 to 2.00 microns, 2.50 to 2.90 microns, 4.1 to 4.4 microns, 5.5 to 7.3 microns. In some preferred embodiments the first and/or the second of these ranges are used. In some preferred embodiments, the filter allows passage of not more than 50% of incident energy for wavelengths being outside the low atmospheric transmission ranges and sensed by the pixel array. In some other preferred embodiments, the filter passes not more than 25%, 10%, and 2% of this energy.

FIG. 5C illustrates an effect of increased signal to clutter ratio in the ranges of low atmosphere transmission. Graph G1 shows the sun irradiance, i.e. the intensity of sun radiation, on a clear day at the sea level, Graphs G2, G3, G4 show ratios of the intensity of light produced by an exemplary muzzle flash respectively at distances of 100, 200 and 300 m, from the detector, to the sun irradiance of graph G1. Graphs G2, G3, G4 have evident peaks corresponding to the ranges of low atmospheric transmission. These peaks correspond to the increased signal to clutter ratio.

It should be noted, that peaks in graphs G2, G3, G4 can decrease with an increase in the atmosphere humidity level. In this case the spectral range may be widened to include wavelengths of smaller atmospheric absorption.

The effect of the clutter can be considered in more detail. The clutter is composed of several components. The first component is the sun radiation and reflections of sun radiation from various objects (e.g. from vegetation such as grass and leaves); the maximum of this radiation is within the visible range. This sun (or solar) clutter is non-uniform and impedes the muzzle flash detection. This is because its illumination power and power variation may be similar to the muzzle flash; for example its non-uniformities might cause signal glitches that might be wrongly interpreted as a muzzle flash when the detector is moved.

The second clutter component (the so-called "blackbody clutter" is a black- or gray-body radiation of the detector environment (e.g. air, building walls, etc.). The detector environment has a relatively low temperature (when compared to the temperature of the Sun); it emits light, which wavelength distribution has a maximum intensity in LWIR (e.g. 10 micron). It should be noted that the detector environment temperature is distributed non-uniformly; in some cases these non-uniformities present a useful signal.

The technique of the inventors can treat the above clutter components differently. According to the invention, the photodetector array may be of a type insensitive to the MWIR and LWIR ranges. Thus, the second clutter component (the blackbody clutter) does not generate a significant signal at the detector output. The solar clutter can be detrimental during the day or the night, if moonlight is present; but it can be almost totally prevented by the narrowing of the imaged spectrum to the wavelength in the region(s) of low atmospheric transmission, because at these wavelengths solar or moon light reaching the earth surface is attenuated to essentially zero intensity.

The case when both clutter components are eliminated from the photodetector array signal may be preferred also because it provides for significantly reducing the shot noise associated with the signal. The shot noise is proportional to the square of the total signal: thus, if clutter is not eliminated, it causes a shot noise that could be comparable with the muzzle flash portion of the signal. Moreover, this noise might occasionally produce glitches having temporal and spatial features somewhat similar to those of the muzzle flash because the shot noise would be non-uniform even if the clutter causing it would be uniform.

It should be noted that, as it follows from the blackbody clutter wavelength distribution, the clutter and the shot noise can be eliminated for the larger portions in the NIR rather than the SWIR range.

Also, it should be noted, that the invented technique of maximizing the signal to noise ratio (SNR) is different from a common technique. While the latter would suggest filtering a signal in a frequency range around the signal's peak(s), the technique of the inventors can utilize imaging in the wavelength regions being remote from the muzzle flash signal peak.

The narrowing of the imaged spectrum to the band(s) of low atmospheric transmission is done by means of the optical filter (which may be of any known type), which may be an external filter or may be integrated with the photodetector array; e.g. by introducing a narrow band cavity within the photodetector array.

It should be understood that the use of the band filter is beneficial when the solar clutter is the limiting factor. At night, the solar clutter is orders of magnitude lower and the detector noise becomes the limiting factor. Thus, at night, the filter can be removed or not operated. This would improve the gunshot probability of detection to false alarm count ratio, as well as would allow for night vision, when SWIR is used. Hence, the filter, if being present in the device, is configured in some of the device's preferred embodiments to be shiftable between its operative and inoperative states.

Although the narrowing of the imaged spectrum to the low atmospheric transmission regions can increase the SNR at daylight or moonlight, it should be done so as to allow propagation of sufficiently wide wavelength range(s) to the photodetector. If the signal arriving to the photodetector is too small, the detection will be compromised by the internal (e.g. dark) noise of the detector and the shot noise of the signal. It also should be noted that before arriving to the photodetector the signal is attenuated by the atmospheric absorption and the absorption of the filter. Thus, the exact edges of the filtered wavelength range(s) can vary, so as to maximize the total SNR ratio, in which both clutter and noise are taken into account.

It should be noted that the control unit (or the layer-2 processing unit) can be configured to implement several processing tasks. First, in accordance with the above, it may be configured to determine whether one or a group of the digital or analog layer-1 output signals corresponds to a muzzle flash signal. This may be done by processing the temporal and spatial features of the digital or analog signals, e.g. by comparing the intensity of the analog signals with a certain threshold, or by comparing the received analog signals with various muzzle flash signatures stored in a database in the memory utility. For instance, if an analog processing unit differentiates the photodetector output or subtracts sequential readings of the photodetector output, the analog signals corresponding to a muzzle flash event will have a "positive peak followed by negative peak" signature, e.g. a signature as in FIG. 4B. Also, the muzzle flash radiation can be focused on more than one pixel of the photodetector array (e.g. if the center of the muzzle flash focuses on a line separating the pixels). The control unit can take into account the division of the optical signal between several adjacent pixels.

Second, the control unit may be configured to determine the wavelength range(s) being optimal for detection (i.e. maximizing the SNR ratio). It can facilitate operating the optical filter (e.g. filter 10) and/or the collecting optics so at to achieve this high SNR and/or output these data for the operator's review. Also, the control unit may estimate a distance between the detector and the muzzle flash, for example from the detected intensity of the optical signal; as well as to determine the type of weapon that was shot, etc.

The control unit can be configured to tune the optical filter so as to periodically change its passing band to define a time multiplexing scheme for the muzzle flash detection in more than one wavelength range. For example, the photodetector may be sensitive to two different subbands in the NIR/SWIR ranges, or to a region of ultraviolet/visible range and a region of NIR/SWIR range; etc. Thus various time-multiplexing schemes can be realized. It should be understood that the relative intensities of signals of various wavelength bands carry additional information, for example about the distance to the muzzle flash, in particular due to the difference between atmospheric absorption coefficient being pertinent to the various wavelengths.

It should also be noted, that the time-widths (durations) of muzzle flash pulses corresponding to different bands are generally different. For example, ultraviolet radiation is emitted as a result of the electron transitions between different molecular levels during the chemical reaction of oxygen and burning powder, thus the time-width of the ultraviolet pulse is small; the NIR/SWIR radiation pulse is a result of the thermal radiation of the hottest gas; and the MWIR/LWIR is a result of the thermal radiation of a cooler gas, thus the time-width of the MWIR/LWIR signal is longer. Within the time multiplexing scheme framework, the control unit changes the pass band of the optical filter with a rate of change selected to allow detection of signals of the shortest time width.

The control unit can be configured to operate digital or analog, typically parallel, layer-1 processing unit. For the analog layer-1 processing unit this can be done, for example, by applying voltage to switches in this unit, so as to selectively direct the photodetector output to the circuits designed for processing signals corresponding to input light of different wavelength ranges, as in the time-multiplexing scheme.

Figure 6:
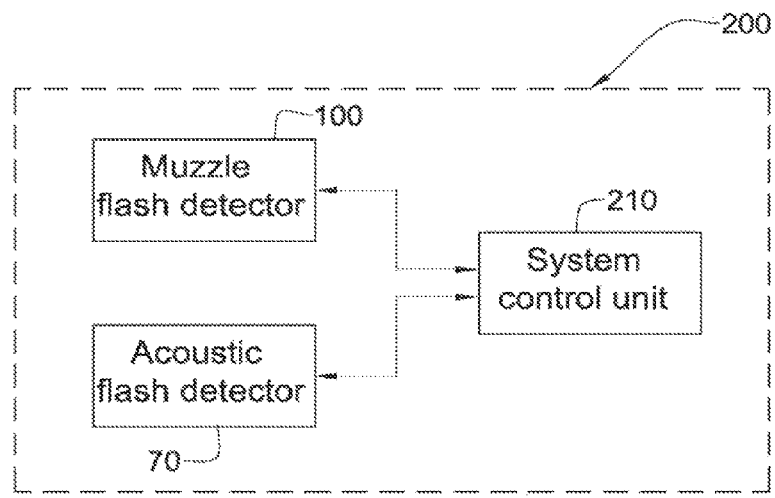
FIG. 6 schematically illustrates an example of a weapons-firing detection system organized according to the inventors' technique.

Referring to FIG. 6, there is schematically shown an example of a weapons-firing detection system 200 of the present invention. System 200 includes a muzzle flash detector 100 (similar to either one of FIG. 2A or 2B), an acoustic detector 70, and a control unit 210. Control unit 210 is configured similar to the above-described control unit and also is adapted to receive and process the output of the acoustic detector so as to compare the detection results of both detectors. This way, most of the false alarms of each of the acoustic and the muzzle flash detector can be avoided: control unit 210 will generate an alarm only when each of the optical and the acoustic detector identifies a gunshot, and a delay between these identifications is within some meaningful limit. The delay between the identifications events at optical and acoustic detectors depends on the distance to the shooter and the speed of sound at frequency sensed by the acoustic detector. Therefore, this delay can be used for determination of the distance to the shooter.

Those skilled in the art will readily appreciate that various modifications and changes can be applied to the embodiments of the invention as hereinbefore described without departing from its scope defined in and by the appended claims.

The invention claimed is:

1. A method for use in detecting and locating a muzzle flash event, the method comprising imaging electromagnetic radiation by an imager comprising a non cryogenically cooled Photo Detector Array (PDA) sensitive in at least a portion of a SWIR spectrum, wherein said electromagnetic radiation propagating towards the PDA undergoes filtering for selectively passing towards the PDA the electromagnetic radiation of one or more spectral ranges of relatively low transmission in atmosphere of said at least portion of the SWIR spectrum.

2. The method of claim 1, wherein said imager comprises at least 10,000 pixels.

3. The method of claim 1, wherein an integration time of the PDA is shorter than $10^{-2}$ s.

4. The method of claim 3, wherein the imaging recurring with dead time shorter than a duration of the muzzle flash event.

5. The method of claim 1, wherein the imaging is substantially within the range of low atmospheric light transmission at least partially including the trough situated around 1.15 μm (micron).

6. The method of claim 1, wherein the imaging is substantially within the range of low atmospheric light transmission at least partially including a trough extending from 1.34 μm to 1.50 μm.

7. The method of claim 1, wherein the imaging is substantially within the range of low atmospheric light transmission at least partially including a trough extending from 1.80 μm to 2.00 μm.

8. The method of claim 1, wherein said filter passes less than 10% of energy of wavelengths being outside said spectral range of low atmospheric transmission and sensed by the PDA.

9. The method of claim 1, wherein said filter passes less than 2% of energy of wavelengths being outside said spectral range of low atmospheric transmission and sensed by the PDA.

10. A device for use in detection and location of a muzzle flash event, the device comprising an imager comprising a non cryogenically cooled Photo Detector Array (PDA) sensitive in at least a portion of the SWIR spectrum, and a filter of electromagnetic radiation configured and operable for selectively passing therethrough spectral bands corresponding to relatively low transmission of the electromagnetic radiation in atmosphere for said at least portion of the SWIR spectrum.

11. The device of claim 10, wherein said PDA comprises at least 10,000 pixels.

12. The device of claim 10, wherein the PDA has an integration time shorter than $10^{-2}$ s.

13. The device of claim 12 wherein said PDA has a dead time shorter than a duration of the muzzle flash event.

14. The device of claim 10, wherein the PDA has a sensitivity cut-off at a wavelength in between 1.4 μm and 2.5 μm.

15. The device of claim 10, wherein the device is adapted to sense electromagnetic radiation substantially within a range of low atmospheric light transmission at least partially including the trough situated around 1.15 μm (micron).

16. The device of claim 10, wherein the device is adapted to sense electromagnetic radiation substantially within a range of low atmospheric light transmission at least partially including a trough extending from 1.34 μm to 1.50 μm.

17. The device of claim 10, wherein the device is adapted to sense electromagnetic radiation substantially within a range of low atmospheric light transmission at least partially including a trough extending from 1.80 μm to 2.00 μm.

18. The device of claim 10, wherein said filter passes less than 10% of energy of wavelengths being outside said spectral range of low atmospheric transmission and sensed by the PDA.

19. The device of claim 10, wherein said filter passes less than 2% of energy of wavelengths being outside said spectral range of low atmospheric transmission and sensed by the PDA.

* * * * *